United States Patent
Weiss et al.

(10) Patent No.: US 10,934,025 B2
(45) Date of Patent: Mar. 2, 2021

(54) MODEL PREDICTIVE CONTROL OF SPACECRAFT

(71) Applicant: Mitsubishi Electric Research Laboratories, Inc., Cambridge, MA (US)

(72) Inventors: Avishai Weiss, Cambridge, MA (US); Stefano Di Cairano, Newton, MA (US); Ryan Caverly, Montreal (CA)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 659 days.

(21) Appl. No.: 15/920,786

(22) Filed: Mar. 14, 2018

(65) Prior Publication Data

US 2019/0286168 A1 Sep. 19, 2019

(51) Int. Cl.
| | |
|---|---|
| *G05D 1/08* | (2006.01) |
| *B64G 1/24* | (2006.01) |
| *B64G 1/36* | (2006.01) |
| *B64G 1/28* | (2006.01) |
| *B64G 1/26* | (2006.01) |
| *B64G 1/40* | (2006.01) |

(52) U.S. Cl.
CPC ............. *B64G 1/244* (2019.05); *B64G 1/242* (2013.01); *B64G 1/26* (2013.01); *B64G 1/283* (2013.01); *B64G 1/286* (2013.01); *B64G 1/361* (2013.01); *B64G 1/365* (2013.01); *B64G 1/405* (2013.01); *G05D 1/0808* (2013.01); *G05D 1/0875* (2013.01); *G05D 1/0891* (2013.01)

(58) Field of Classification Search
CPC ........ B64G 1/244; B64G 1/283; B64G 1/286; B64G 1/26; B64G 1/242; B64G 1/361; B64G 1/365; B64G 1/405; G05D 1/0891; G05D 1/0808; G05D 1/0875
USPC .......................................................... 701/13
See application file for complete search history.

(56) References Cited

U.S. PATENT DOCUMENTS

| | | | | |
|---|---|---|---|---|
| 6,032,904 A * | 3/2000 | Hosick | ..................... | B64G 1/26 244/169 |
| 6,102,337 A * | 8/2000 | Quartararo | ............... | B64G 1/26 244/169 |
| 6,435,457 B1 * | 8/2002 | Anzel | ..................... | B64G 1/26 244/169 |

(Continued)

*Primary Examiner* — Jonathan M Dager
*Assistant Examiner* — Jean W Charleston
(74) *Attorney, Agent, or Firm* — Gennadiy Vinokur; James McAleenan; Hironori Tsukamoto

(57) ABSTRACT

A spacecraft including a spacecraft bus and a set of thrusters for changing a pose of the spacecraft. Wherein at least two thrusters are mounted on a gimbaled boom assembly connecting the two thrusters with the spacecraft bus, such that the two thrusters are coupled thrusters sharing the same gimbal angle. A model predictive controller to produce a solution for controlling thrusters of the spacecraft by optimizing a cost function over multiple receding horizons. The cost function is composed of a cost accumulated over the multiple receding horizons, including a cost accumulated over a first horizon using a dynamics governing a north-south position of the spacecraft, and a cost accumulated over a second horizon using a model of dynamics of the spacecraft governing an east-west position. A thruster controller to operate the thrusters according to their corresponding signals.

21 Claims, 15 Drawing Sheets

(56) References Cited

U.S. PATENT DOCUMENTS

| | | | |
|---|---|---|---|
| 10,183,764 B1 * | 1/2019 | Chu | B64G 1/1007 |
| 2005/0080522 A1 * | 4/2005 | Hamamatsu | G05D 1/0206 |
| | | | 701/21 |
| 2010/0019092 A1 * | 1/2010 | Liu | B64G 1/38 |
| | | | 244/170 |
| 2013/0325306 A1 * | 12/2013 | Caveney | G08G 1/052 |
| | | | 701/117 |
| 2016/0194095 A1 * | 7/2016 | Weiss | B64G 1/26 |
| | | | 701/13 |
| 2017/0269610 A1 * | 9/2017 | Weiss | B64G 1/283 |

* cited by examiner

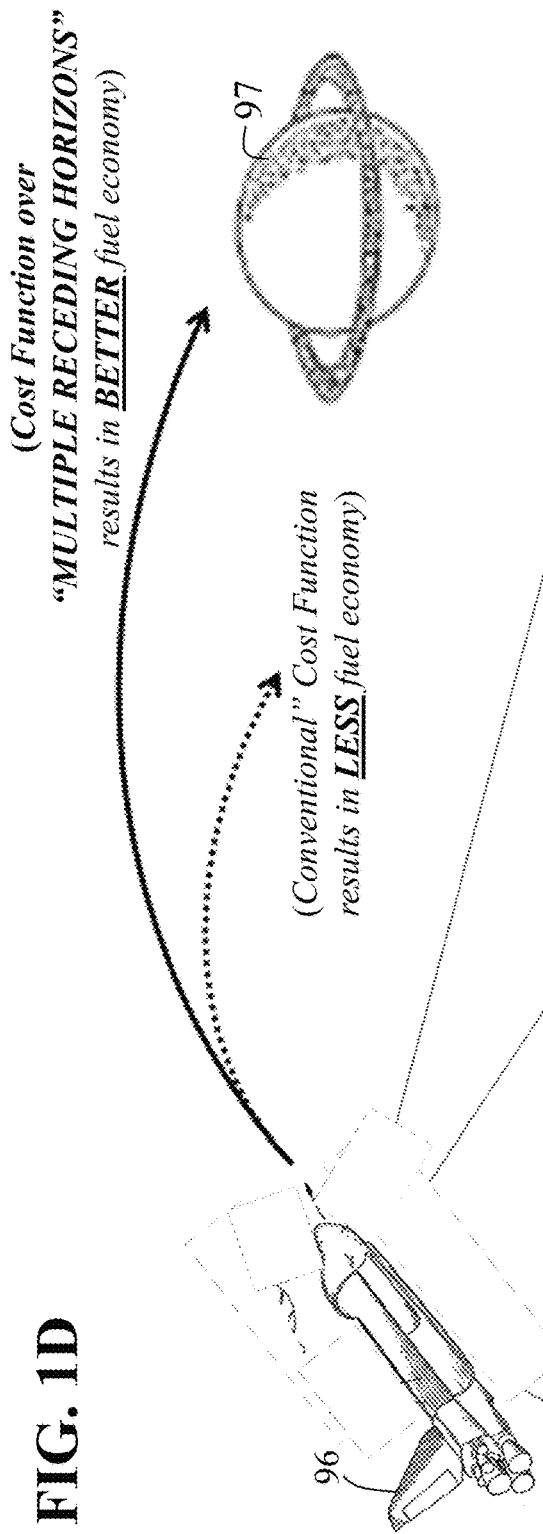

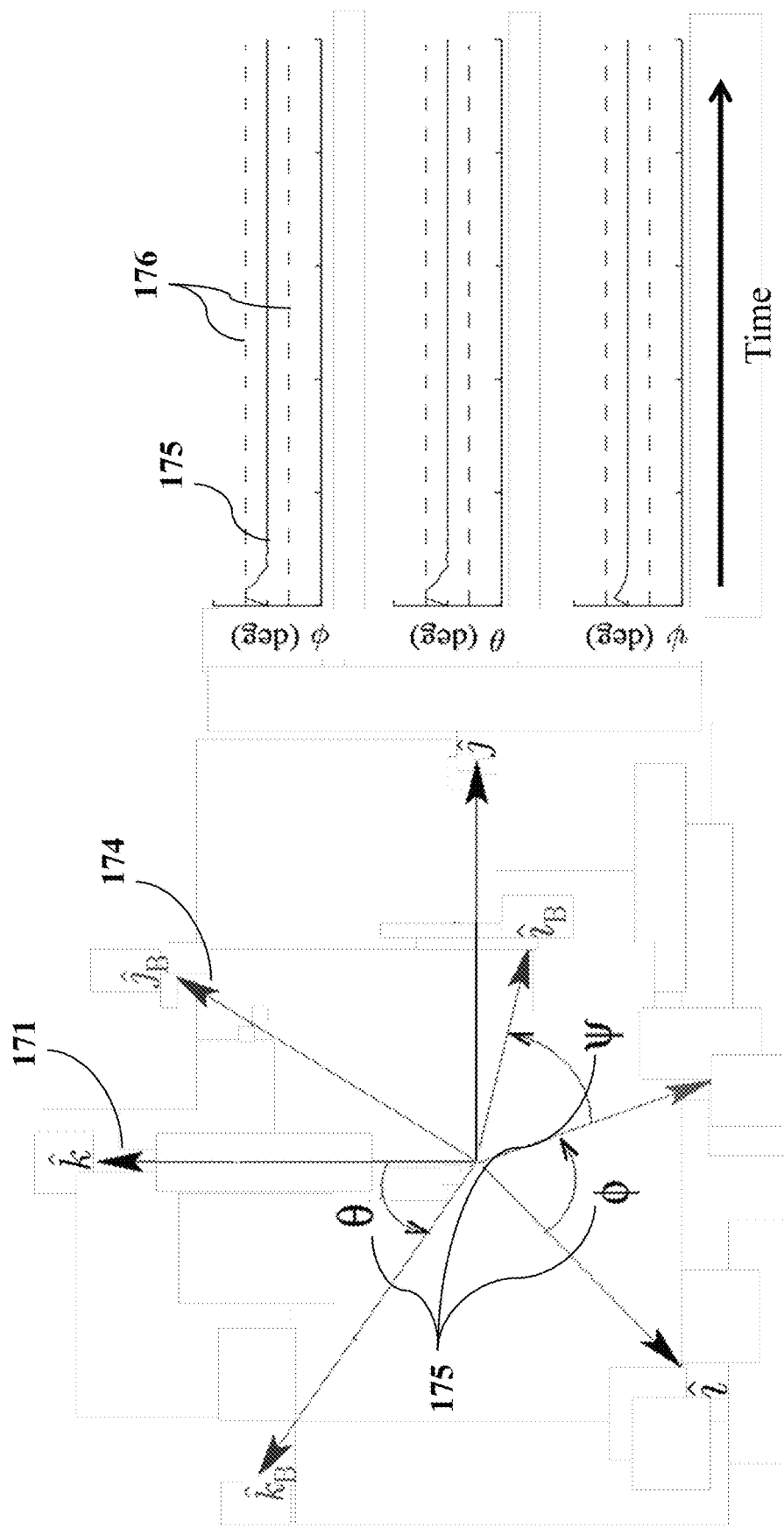

MODEL PREDICTIVE CONTROL OF SPACECRAFT

FIELD

The present disclosure relates generally to controlling an operation of a spacecraft, and more particularly to concurrent station keeping, attitude control, and momentum management of spacecraft using a model predictive control (MPC) over a receding horizon, that simultaneously attains specific station keeping and unload stored momentum using a single set of thrusters.

BACKGROUND

A spacecraft in orbit is subject to various disturbance forces that affect its ability to maintain its station, i.e., desired orbit and position on the desired orbit. To counteract these forces, spacecraft are generally equipped with thrusters for station keeping maneuvers. In addition to orbital perturbations, spacecraft can be disturbed by external torques that are generally absorbed by onboard momentum exchange devices, such as reaction wheels or control moment gyroscopes, allowing the spacecraft to maintain a desired orientation relative to the Earth or stars. To prevent saturation of the momentum exchange device and subsequent loss of the desired spacecraft attitude, the stored angular momentum is periodically unloaded via the onboard thrusters. Combined station keeping and momentum unloading problem using the same set of thrusters results in multiple objectives, and methods for coordinating such objectives in order to achieve them concurrently are challenging, see, e.g., method described in U.S. Pat. No. 8,282,043 that simplify the control by using maximum values available for torques and forces of the thrusters.

Furthermore, there are often restrictions on the placement of thrusters on a spacecraft so that antennas and solar panels may be deployed without the risk of thruster plume impingement. Restricting the placement of thrusters that are used for both station keeping and momentum unloading can preclude the thrusters to provide pure torques without also applying a net force on the satellite. Therefore, firing the thrusters may affect the spacecraft position and orientation (pose) as well as the stored momentum, creating a problem of concurrent station keeping, attitude control, and momentum management.

Model predictive control (MPC) of a spacecraft can provide an autonomous control that can be implemented in an onboard control system resulting in tighter and more accurate station keeping, attitude control, and momentum unloading. However, the onboard control system can have limited computational and memory capability. To that end, a computationally efficient implementation of an MPC that considers various restrictions on the placement of thrusters on a spacecraft is challenging.

Therefore, a need exists in the art for an improved way to control an operation of a spacecraft, for concurrent station keeping, attitude control and momentum management.

SUMMARY

Embodiments of the present disclosure are directed to controlling an operation of a spacecraft for concurrent control of an orbital position, orientation, and accumulated onboard momentum using a single set of thrusters by using a model predictive control (MPC) optimizing a cost function over multiple finite receding horizons. Along with providing the MPC that can be implemented in an onboard control system of the spacecraft while also considering various restrictions on the placement and/or range of rotations of the thrusters of the spacecraft.

Some embodiments of the present disclosure provide the model predictive control (MPC) that can be implemented in an onboard control system of the spacecraft. Specifically, the MPC can produce a solution for controlling the thrusters of the spacecraft via a thruster controller, by optimizing a cost function over a finite of receding horizons using a model of dynamics of the spacecraft that effects a pose of the spacecraft and a model of dynamics of momentum exchange devices of the spacecraft that effects an orientation of the spacecraft.

In some embodiments of the present disclosure the cost function of the MPC utilizes different length finite receding horizons for different components of the spacecraft model in order to achieve delta-v efficient maneuvers. For example, states of the spacecraft model associated with the north-south station keeping (NSSK) may be included in the cost function using a shorter horizon than other states of the spacecraft model that are associated with east-west station keeping (EWSK), orientation control, or accumulated onboard momentum management.

According to an embodiment of the present disclosure, a spacecraft including a spacecraft bus and a set of thrusters for changing a pose of the spacecraft. Wherein at least two thrusters are mounted on a gimbaled boom assembly connecting the two thrusters with the spacecraft bus, such that the two thrusters are coupled thrusters sharing the same gimbal angle. A set of momentum exchange devices for absorbing disturbance torques acting on the spacecraft. A model predictive controller (MPC) to produce a solution for controlling thrusters of the spacecraft by optimizing a cost function over multiple receding horizons. Wherein the cost function is composed of a cost accumulated over the multiple receding horizons. Such that the cost accumulated over the multiple receding horizon includes a cost accumulated over a first horizon using a dynamics governing a north-south position of the spacecraft, and a cost accumulated over a second horizon using a model of dynamics of the spacecraft governing an east-west position. Where the first horizon is shorter than the second horizon. A thruster controller to operate the thrusters according to their corresponding signals.

According to another embodiment of the present disclosure, a vehicle including a model predictive controller (MPC) to produce a solution for controlling actuators of the vehicle by optimizing a cost function over multiple receding horizons. Wherein the cost function is composed of a cost accumulated over the multiple receding horizons. Such that the cost accumulated over the multiple receding horizon includes a first horizon using a dynamics governing a partial position of the vehicle. Along with a cost accumulated over a second horizon using a model of dynamics of the vehicle governing another partial positions. Where the first horizon is shorter than the second horizon. An actuator controller to operate the actuators according to their corresponding signals.

According to another embodiment of the present disclosure, a spacecraft having a spacecraft bus and a set of thrusters for changing a pose of the spacecraft. Wherein at least two thrusters are mounted on a gimbaled boom assembly connecting the two thrusters with the spacecraft bus. Such that the two thrusters are coupled thrusters sharing the same gimbal angle and the spacecraft also includes a set of momentum exchange devices for absorbing disturbance torques acting on the spacecraft. The spacecraft comprising a model predictive controller (MPC) to produce a solution for controlling thrusters of the spacecraft by optimizing a cost function over multiple receding horizons. Wherein the cost function is composed of a cost accumulated over the multiple receding horizons. Such that the cost accumulated over the multiple receding horizon includes a first horizon using a dynamics governing a north-south position of the spacecraft. Along with a cost accumulated over a second horizon using a model of dynamics of the spacecraft governing an east-west position and a model of dynamics of the momentum exchange devices of the spacecraft effecting a total orientation of the spacecraft. Where the first horizon is shorter than the second horizon. Wherein the dynamics are associated with a motion of the spacecraft. A thruster controller to operate the thrusters according to their corresponding signals.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1D is a block diagram illustrating the cost function over multiple receding horizons improved spacecraft fuel economy, according to embodiments of the present disclosure;

FIG. 1G is a schematic illustrating Euler Angles between the spacecraft-fixed reference frame and the desired reference frame, according to embodiments of the present disclosure, according to embodiments of the present disclosure;

FIG. 1H are graphs illustrating the Euler Angles that remain within limits during the momentum unloading process, according to embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

Embodiments of present disclosure are directed to controlling an operation of a spacecraft for concurrent control of an orbital position, orientation, and accumulated onboard momentum using a single set of thrusters. Along with providing a model predictive control (MPC) that can be implemented in an onboard control system of the spacecraft while considering various restrictions on the placement and/or range of rotations of the thrusters of the spacecraft.

Some embodiments of the present disclosure provide a model predictive control (MPC) that can be implemented in an onboard control system of the spacecraft that considers various restrictions on a placement and/or range of rotations of thrusters of the spacecraft. Specifically, the MPC can produce a solution for controlling the thrusters of the spacecraft via a thruster controller, by optimizing a cost function over a finite receding horizon using a model of dynamics of the spacecraft that effects a pose of the spacecraft and a model of dynamics of momentum exchange devices of the spacecraft that effects an orientation of the spacecraft.

Figure 1A:
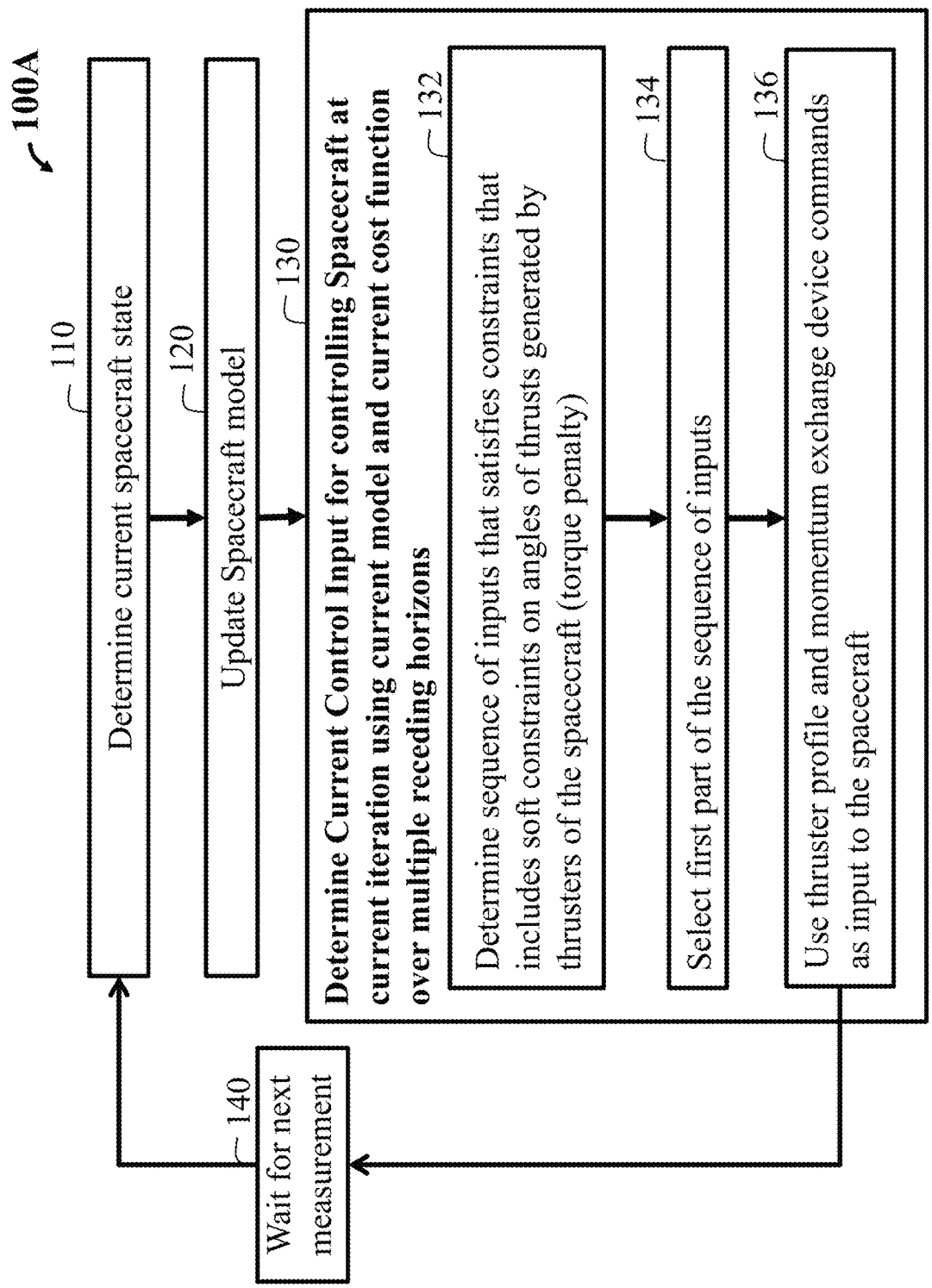
FIG. 1A is a block diagram illustrating a method for controlling an operation of a spacecraft according to a model of the spacecraft, according to embodiments of the present disclosure.
Figure 1B:
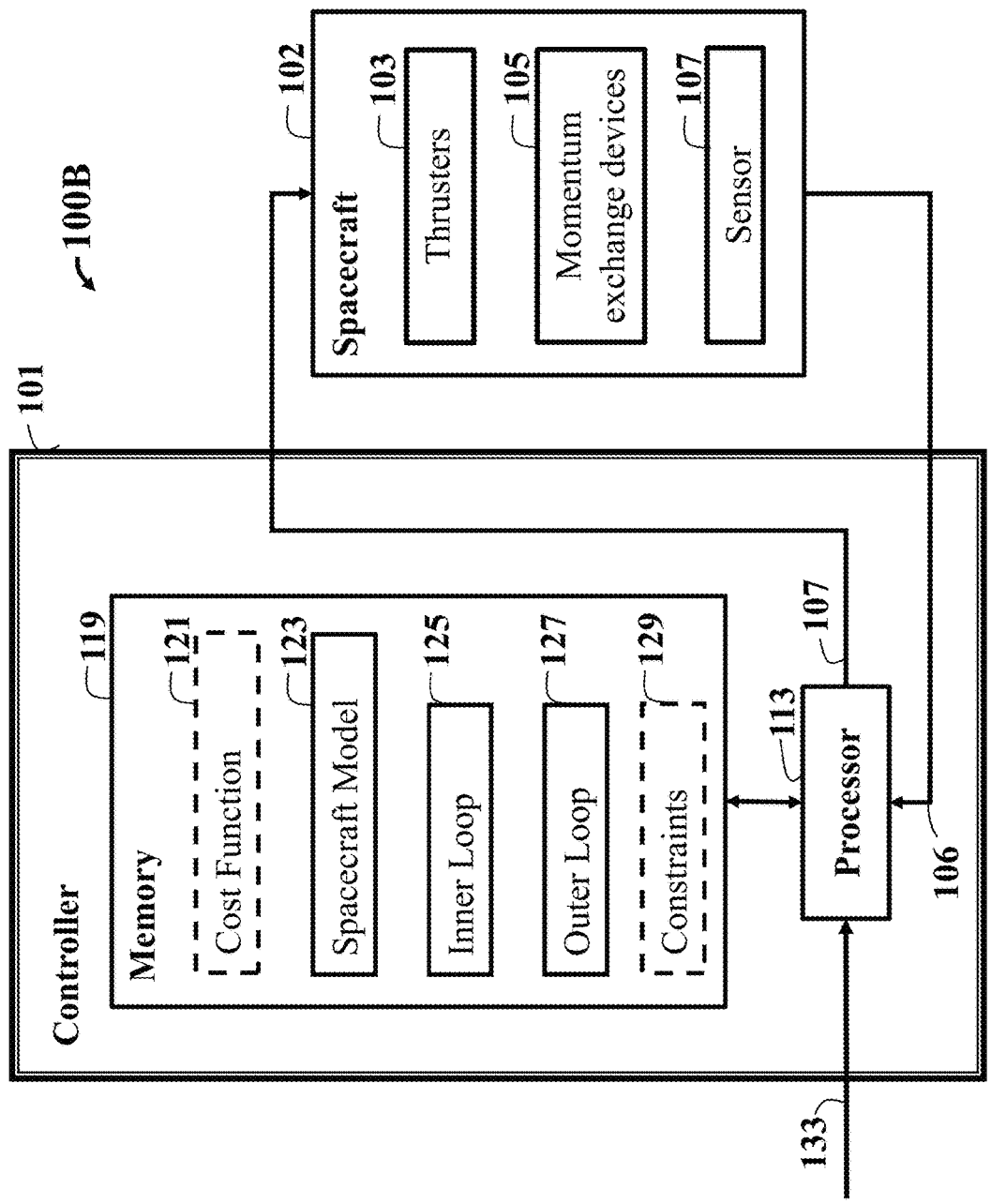
FIG. 1B is a block diagram illustrating a structure of the controller of FIG. 1A, according to embodiments of the present disclosure.

Referring to FIG. 1A and FIG. 1B, FIG. 1A is a block diagram illustrating a method 100A for controlling an operation of a spacecraft, according to embodiments of the present disclosure. FIG. 1B is a block diagram illustrating some components of the method 100A of FIG. 1A, according to embodiments of the present disclosure. Method 100A controls iteratively the operation of the spacecraft with control inputs determined using a model of the spacecraft based on an optimization of a cost function.

Method 100A in FIG. 1A, initially begins with step 110 determining a current state of the spacecraft, of which, the current state of the spacecraft can be determined using sensors (108 of FIG. 1B), or other aspects such as hardware or software. In addition, the current state of the spacecraft can be obtained from communication with a ground command center located on Earth or another spacecraft located in outer space, e.g. GPS, relative range measurements, star trackers, horizon sensors, or the like. It is also possible to determine the current spacecraft state based on a previous control input determined for a previous iteration that is optimized with a previous cost function using a previous model of the spacecraft.

The next step 120 of FIG. 1A can be updating spacecraft model. Wherein, the spacecraft model update step 120 can include linearization of the spacecraft model at the desired target location on a target orbit for the current time instant and over a future prediction horizon. The spacecraft model update step 120 can also compute predicted disturbance forces over the same horizon at the target location and combines it with the dynamics prediction model to form an overall prediction. Finally, in some embodiments of the present disclosure, the spacecraft model update step 120 can also update a stability component of the cost function to the correct value for the current time instant and over a future prediction horizon.

Next, step 130 of FIG. 1A determines a current control input for controlling the spacecraft at the current iteration using the current model and the current cost function. For example, the method uses the updated current cost function and current spacecraft model for step 134 to determine a sequence of future inputs of thruster forces from the current time instant for a fixed amount of time in the future, so long as to at least obtain a new spacecraft state measurement. So that, the predicted future spacecraft states and inputs satisfy the constraints on the operation of the spacecraft and constraints on the control inputs. The next step 136, includes the first part of the input sequence, for a duration equal to an amount of time needed to obtain a new measurement of the state of the spacecraft. Which is selected and applied to the next step 138, as the current control input to the spacecraft. Based on the determined current state of the spacecraft step 110, the current updated model of the spacecraft step 120, and the determined current control input step 130 to the spacecraft, a next state of the spacecraft is determined, and at step 140, the controller waits until a new state measurement is received.

FIG. 1B is a block diagram illustrating some components of the controller for implementing the method of FIG. 1A, according to embodiments of the present disclosure. Method 100A can include a control system or controller 101 that has at least one processor 113 for executing modules of the controller. The controller 101 can be in communication with a processor 113 and a memory 119. Wherein the memory can have at least one stored thereon including the cost function 121, the spacecraft model 123, an inner loop 125, an outer loop 127 and the constraints 129. Wherein the modules of the controller can be part of either the inner loop 125 and the outer loop 127. The constraints can represent physical limitations of the spacecraft 102, safety limitations on the operation of the spacecraft 102, and performance limitations on a trajectory of the spacecraft 102.

Further, method 100A can determine control inputs 107 via the processor 113, using the model of the spacecraft 123 subject to the constraints. Wherein the determined control inputs 107 can be sent to the spacecraft 102. Further the spacecraft 102 can have thrusters 103, momentum exchange devices 105 and sensors 107, among other components. Wherein, the current state 106 of the spacecraft 102 can be obtained from the sensors 107 and communicated to the processor 113. Wherein the controller 101 can receive desired inputs 133 for the spacecraft 102 via the processor 113.

In at least one embodiment, the processor 113 can determine and/or update at least one of the cost function 121, the spacecraft model 123, the constraints 129 during the control. For example, the control system 101 can execute method 100A that controls iteratively the operation of the spacecraft 102 with control inputs of step 130 of FIG. 1A determined using the model 123 of the spacecraft, based on an optimization of a cost function. It is possible that method 100A could also be executed by the controller 101 based on a previously iteratively operation of the spacecraft 102, i.e. from a previously iterative control operation having a previous control input determined for a previous iteration that is optimized by a previous cost function using a previous model of the spacecraft.

Figure 1C:
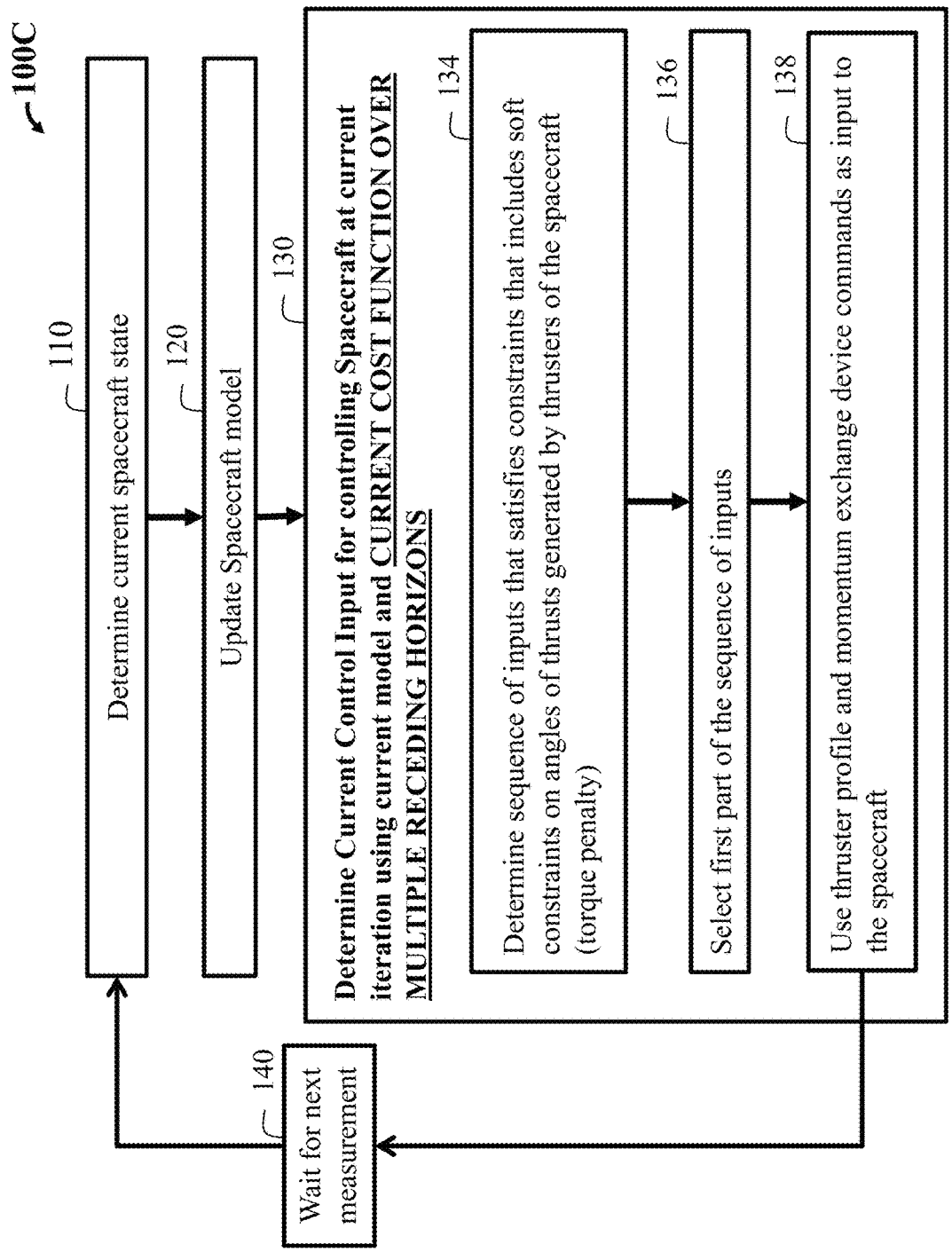
FIG. 1C is a schematic illustrating the controller of FIG. 1A with the spacecraft in outer space, according to embodiments of the present disclosure.
Figure 1E:
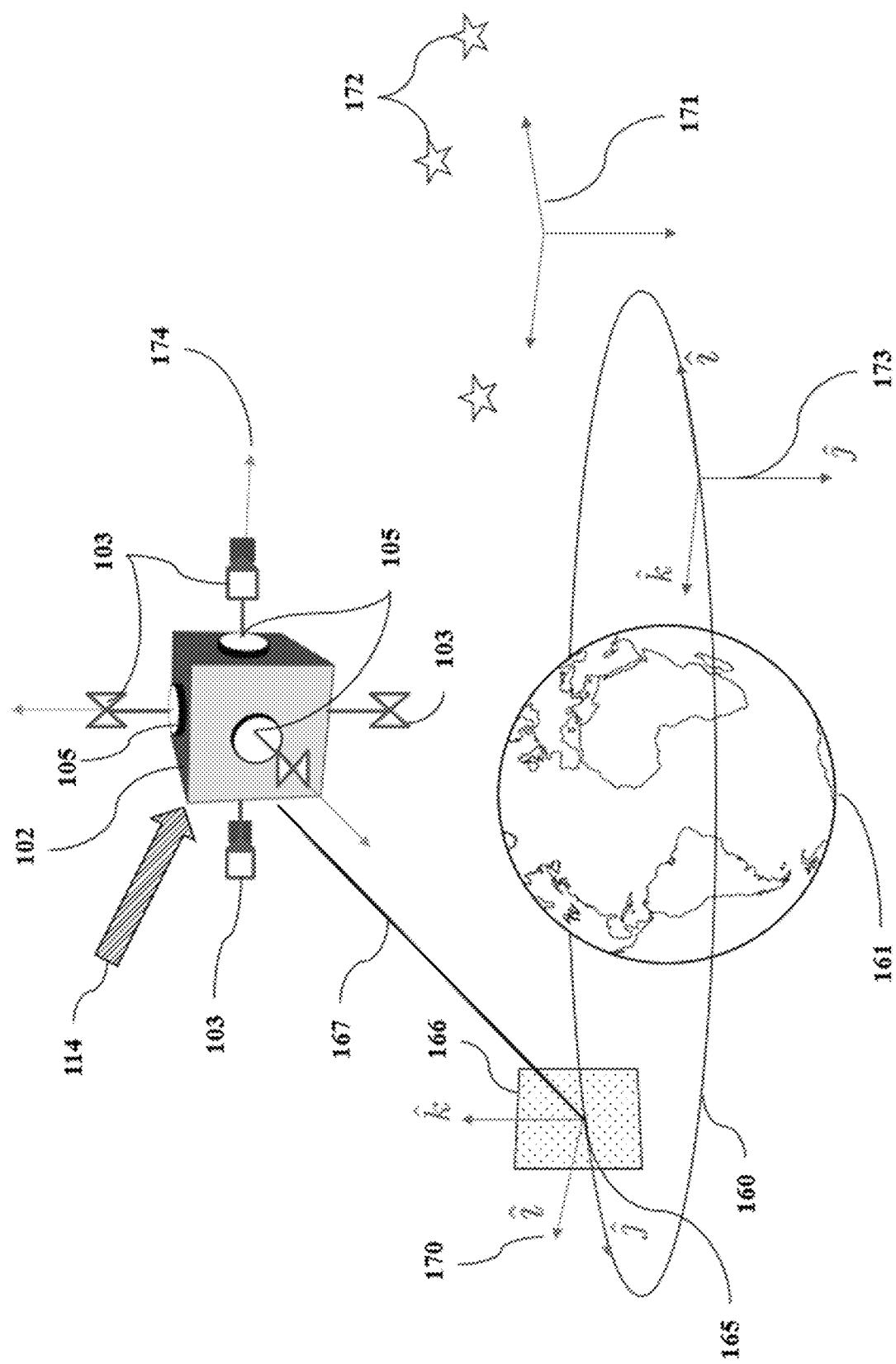
FIG. 1E is the schematic illustrating the controller with the spacecraft in outer space of FIG. 1C, wherein the spacecraft is to remain within a window with specified dimensions around the desired position, according to embodiments of the present disclosure.

Referring to FIG. 1C and FIG. 1E, wherein FIG. 1C is a schematic illustrating the controller of FIG. 1A with the spacecraft in outer space, according to embodiments of the present disclosure. FIG. 1E is the schematic illustrating the controller with the spacecraft in outer space of FIG. 1C, wherein the spacecraft is to remain within a window with specified dimensions around a desired position 165, according to embodiments of the present disclosure.

For example, FIG. 1C and FIG. 1E show the spacecraft 102 equipped with a plurality of actuators such as thrusters 105 and momentum exchange devices 105. Examples of the type of momentum exchange devices 105 can include reaction wheels (RWs) and gyroscopes. The spacecraft 102 can be a vehicle, vessel, or machine designed to fly in outer space whose operation changes quantities such as the position of the spacecraft, its velocities, and its attitude or orientation, in response to commands that are sent to the actuators 103. When commanded, the actuators 103 impart forces on the spacecraft 102 that increase or decrease the velocity of the spacecraft 102. Thus cause the spacecraft 102 to translate its position, and, when commanded, the actuators 103 also impart torques on the spacecraft 102. The imparted torque can cause the spacecraft 102 to rotate, and thereby change its attitude or orientation. As used herein, the operation of the spacecraft 102 can be determined by the operation of the actuators 103 that determine a motion of the spacecraft 102 that changes such quantities.

Still referring to FIG. 1C and FIG. 1E, the spacecraft 102 flies in outer space along an open or closed orbital path 160 around, between, or near one or more gravitational bodies, such as the Earth 161, moon, and/or other celestial planets, stars, asteroids, comets. Usually, a desired or target position 165 along the orbital path is given. A reference frame 170 is attached to the desired position 165, where the origin of the frame, i.e., the all zeros coordinates in that reference frame 170 are the coordinates of the desired position 165 at all times, and $\hat{i}, \hat{j}, \hat{k}$, are standard unit vectors representing the axes of the reference frame.

The spacecraft 102 can be subject to various disturbance forces 114. These disturbance forces 114 can include forces that were not accounted for when determining the orbital path 160 for the spacecraft 102. These disturbance forces 114 act on the spacecraft 102 to move the spacecraft 102 away from the desired position on the orbital path 160. These disturbance forces 114 can include, but are not limited to, gravitational attraction, radiation pressure, atmospheric drag, non-spherical central bodies, and leaking propellant. Thus, the spacecraft 102 can be at a distance 167 away from the target position 165.

FIG. 1D is a block diagram illustrating the cost function over multiple receding horizons that can improve the spacecraft fuel economy, according to embodiments of the present disclosure. Wherein, the model predictive controller (MPC) can produce a solution for controlling thrusters of the spacecraft by optimizing the cost function over multiple receding horizons 130.

Step 131 of FIG. 1, includes the cost function being composed of a cost accumulated over the multiple receding horizons, such that the cost accumulated over the multiple receding horizon includes a first horizon using a dynamics governing a north-south position of the spacecraft.

Step 133 of FIG. 1, includes a cost that is accumulated over a second horizon using a model of dynamics of the spacecraft governing an east-west position and a model of dynamics of the momentum exchange devices of the spacecraft effecting a total orientation of the spacecraft, where the first horizon is shorter than the second horizon.

It is contemplated that the spacecraft could be a vehicle, such as a car, a boat, an airplane or a spacecraft. For example, the vehicle can include a model predictive controller (MPC) to produce a solution for controlling actuators of the vehicle by optimizing a cost function over multiple receding horizons. Wherein the cost function is composed of a cost accumulated over the multiple receding horizons. Such that the cost accumulated over the multiple receding horizon includes a first horizon using a dynamics governing a partial position of the vehicle. Along with a cost accumulated over a second horizon using a model of dynamics of the vehicle governing another partial positions. Where the first horizon is shorter than the second horizon. An actuator controller to operate the actuators according to their corresponding signals.

Figure 1F:
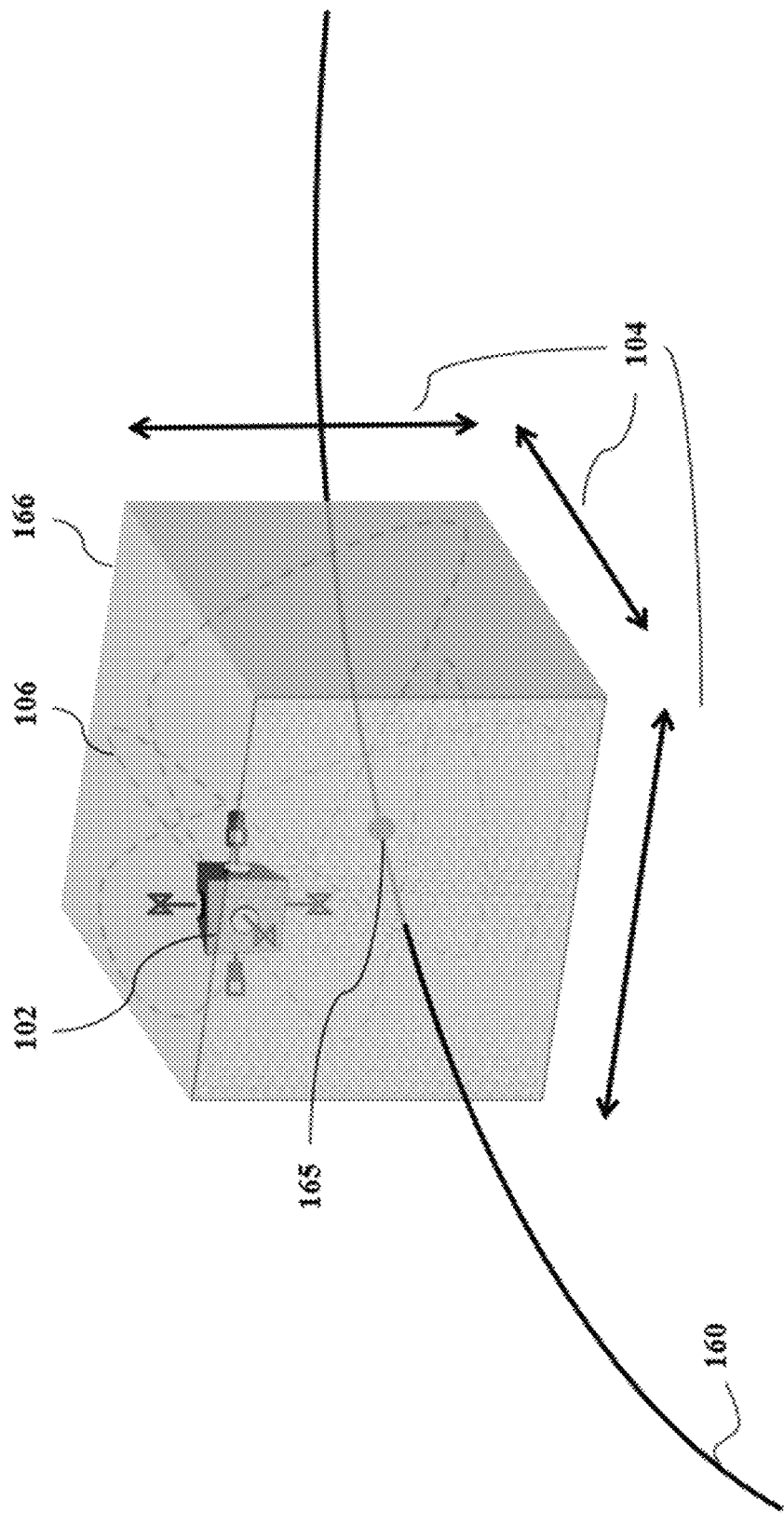
FIG. 1F is a schematic illustrating a desired area for the spacecraft remain, for example, within a window with specified dimensions around the desired position, according to embodiments of the present disclosure.

FIG. 1F is a schematic illustrating a desired area for the spacecraft remain, for example, within a window with specified dimensions around the desired position, according to embodiments of the present disclosure. For example, because of the disturbance forces 114, it is not always possible to keep the spacecraft 102 at the desired position 165 along its orbit 160. As such, it is desired that the spacecraft 102 instead remain within a window 166 with specified dimensions 104 around the desired position 165. To that end, the spacecraft 102 is controlled to move along any path 106 that is contained within the window 166. In this example, the window 166 has a rectangular shape, but the shape of the window 166 can vary for different embodiments.

Referring to FIG. 1C and FIG. 1E, the spacecraft 102 is also often required to maintain a desired orientation. For example, a spacecraft-fixed reference frame 174 is required to be aligned with a desired reference frame such as an inertial reference frame 171 that is fixed relative to distant stars 172, or a reference frame 173 that is always oriented in a manner that points towards the Earth 161. However, depending on the shape of the spacecraft 102, different disturbance forces 114 can act non-uniformly on the spacecraft 102, thereby generating disturbance torques, which cause the spacecraft 102 to rotate away from its desired orientation. In order to compensate for the disturbance torques, momentum exchange devices 105 such as reaction wheels are used to absorb the disturbance torques, thus allowing the spacecraft 102 to maintain its desired orientation. So that the momentum exchange devices 105 do not saturate, and thereby lose the ability to compensate for disturbance torques, their stored momentum must be unloaded, e.g., by reducing spin rates of the reaction wheels. Unloading the momentum exchange devices 105 imparts an undesired torque on the spacecraft 102. Such an undesired torque can also be compensated for by the thrusters 103.

FIG. 1G is a schematic illustrating Euler Angles 175 between the spacecraft-fixed reference frame 174 and the desired reference frame 171, according to embodiments of the present disclosure.

FIG. 1H are graphs illustrating the Euler Angles 175 to remain within limits 176 during the momentum unloading process, according to embodiments of the present disclosure. For example, some embodiments of the present disclosure control the spacecraft 102 such that the Euler Angles 175 remain within limits 176 (FIG. 1F) during the momentum unloading process. The thrusters 103 may be gimbaled in order to allow them to rotate a fixed amount from their nominal alignment with a spacecraft frame.

Figure 1I:
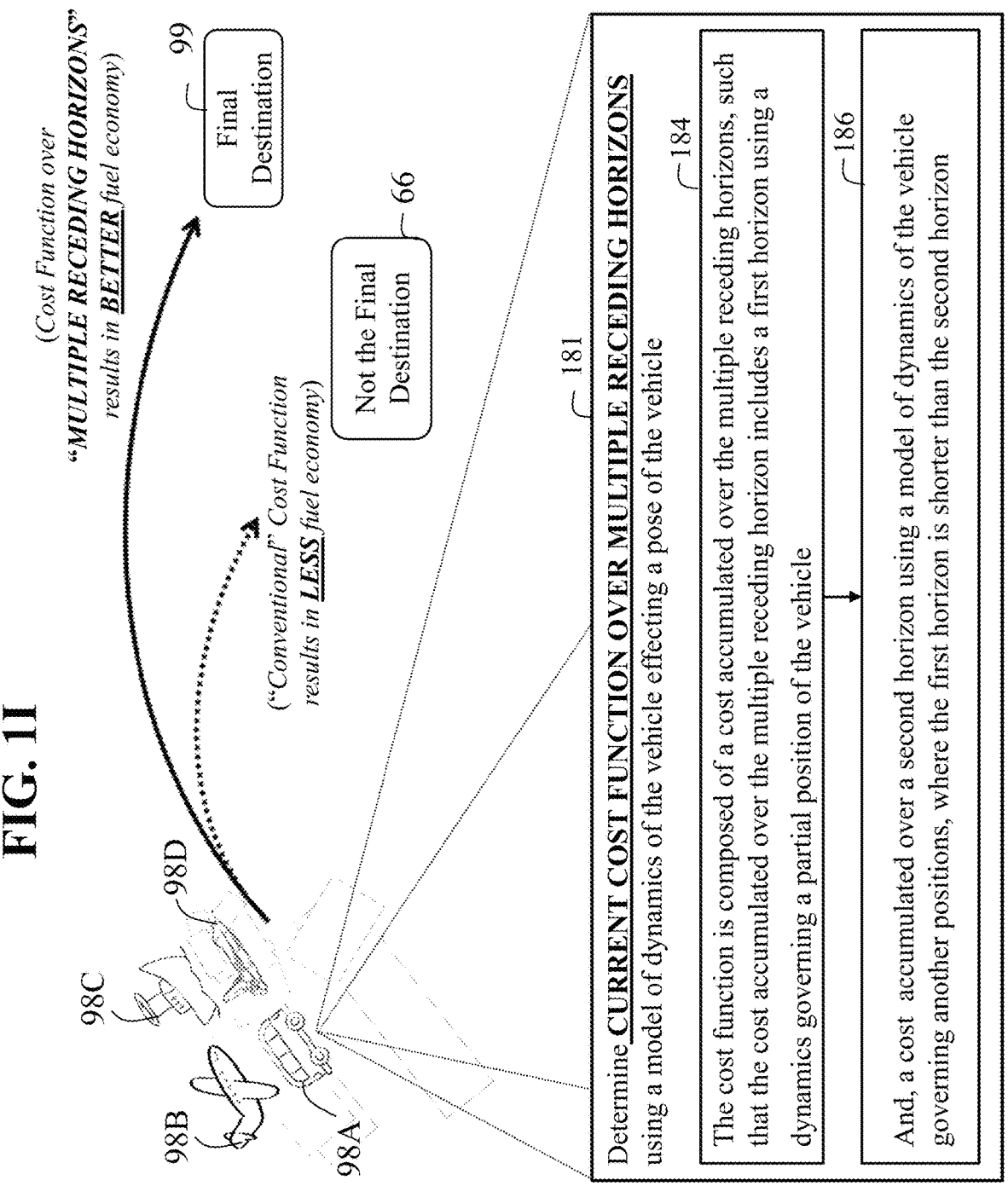
FIG. 1I is a block diagram illustrating the cost function over multiple receding horizons that can improve a vehicle fuel economy, according to embodiments of the present disclosure.

FIG. 1I is a block diagram illustrating the cost function over multiple receding horizons that can improve a vehicle fuel economy, according to embodiments of the present disclosure. Wherein, the model predictive controller (MPC) can produce a solution for controlling actuators of the vehicle by optimizing the cost function over multiple receding horizons 181. Wherein, the vehicle can be a car 98A, a plane 98B, a boat 98C, or spacecraft 98D, traveling to a final destination 99. However, if the vehicle is using a conventional cost function, the vehicle will not reach the final destination 66.

Step 184 of FIG. 1I, includes the cost function composed of a cost accumulated over the multiple receding horizons, such that the cost accumulated over the multiple receding horizon includes a first horizon using a dynamics governing a partial position of the vehicle.

Step 186 of FIG. 1I, includes in addition to step 184, a cost that is accumulated over a second horizon using a model of dynamics of the spacecraft governing an east-west position and a model of dynamics of the momentum exchange devices of the spacecraft effecting a total orientation of the spacecraft, where the first horizon is shorter than the second horizon.

Figure 2:
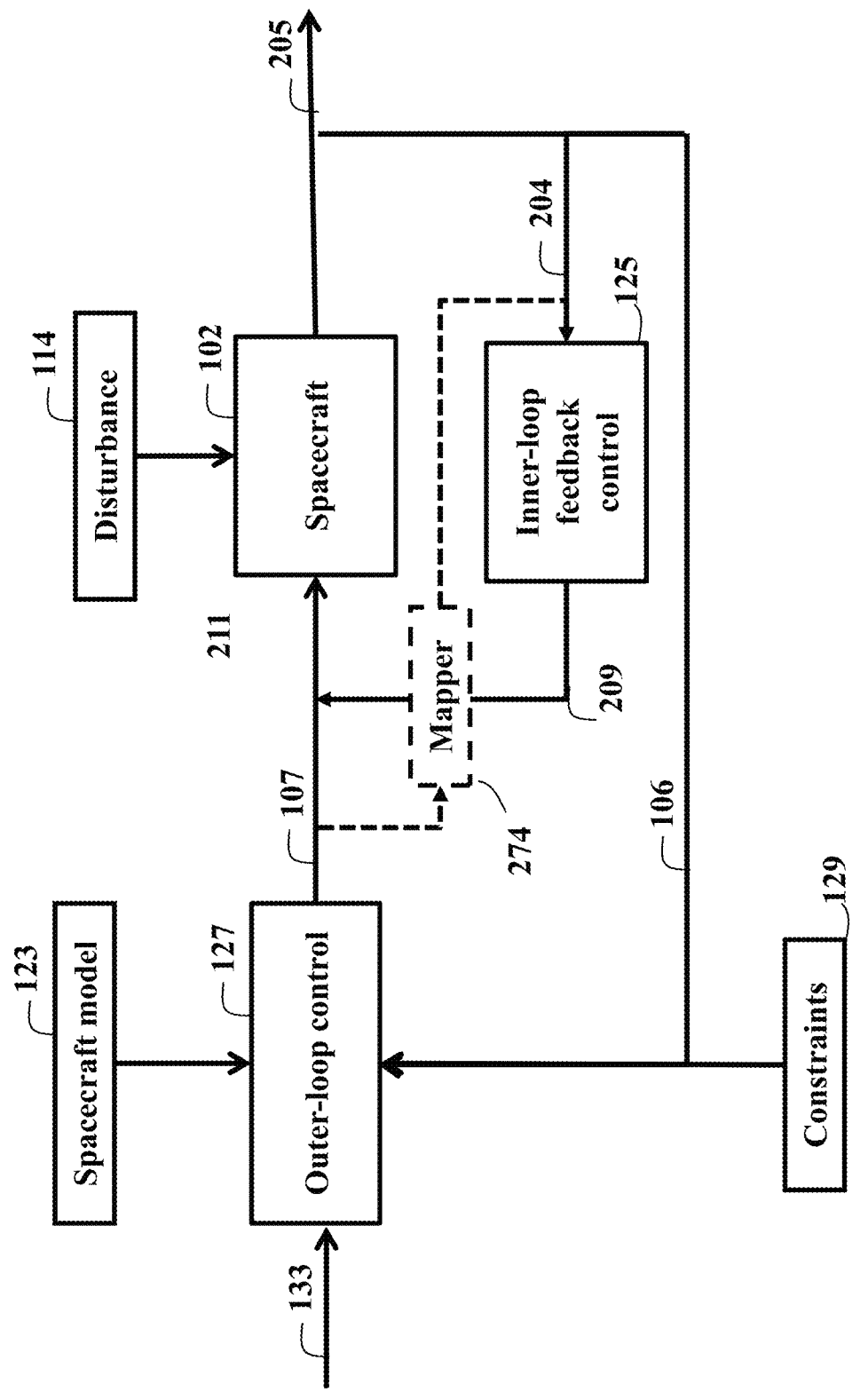
FIG. 2 is a block diagram illustrating an inner-outer loop controller for controlling an operation of a spacecraft, according to embodiments of the present disclosure.

FIG. 2 shows a block diagram of a dual loop controller for controlling an operation of a spacecraft, according to embodiments of the present disclosure. The motion of the spacecraft 102 is affected by disturbance forces and torques 114. For example, the dual loop controller includes an inner-loop feedback control 125 controlling part of the operation of a spacecraft 102, for example, the orientation 174 (FIG. 1E) of the spacecraft-fixed frame relative to a desired frame 171. The steps of the method can be implemented using a processor, e.g., the processor 113 (of FIG. 1B) in communication with the controller 101, another processor of the spacecraft and/or a remote processor.

The inner loop control system 125 can receive information 204 about the spacecraft 102, which is a subset of the total information 106 about the spacecraft motion, from sensors 107 of FIG. 1B, hardware, or software connected directly or remotely to the spacecraft 102. The information 106 includes a state of the spacecraft motion. The subset 204 is relevant for the inner-loop feedback control 125 and is used to generate commands 209 that in the case of orientation (attitude) control are commands to the momentum exchange devices 105 of FIG. 1B. Also shown, is an outer loop control system 127 for controlling the operation of a spacecraft 102. The outer loop control system 127 receives a target operation, e.g., a desired motion 133 for the spacecraft 102, such as a desired trajectory or a target point for some of the quantities, and controls the spacecraft via control inputs 107. The control inputs 107 can include commands to change parameters of the operation of the spacecraft 102 or can include actual values of the parameters such as voltages, pressures, torques, forces that affect the spacecraft.

Still referring to FIG. 2, the control inputs 107 together with the commands 209 form an input 211 to the spacecraft 102 and induce a motion resulting in the generation of quantities 205 for the spacecraft. For example, the input 211 can optionally be formed by a mapper 274. For example, the mapper 274 can combine the unmodified signals 107 and 209 to form the input 211. Additionally, the mapper 274 can determine commands to individual thrusters 103 (FIGS. 1B & 1C) from a total commanded forces and torques for the spacecraft 102, so that the thrusters 103 altogether impart the desired force and torques 107 to the spacecraft 102. The mapper 274 can pass the commands to the onboard momentum exchange devices 105 (FIGS. 1B & 1C) without changing them along with the individual thruster commands as the current control input 204.

The outer-loop control system 127 also receives information 106 about the spacecraft motion. The outer-loop control system 127 uses the state for the selection of the control inputs 107. The information 106 can include some or all of the motion quantities 205 and can also include additional information about the spacecraft 102. The quantities 205, the control inputs 107 or a combination thereof, can be requested to remain in some pre-defined ranges according to constraints 129 on the operation of the spacecraft 102.

Still referring to FIG. 2, some embodiments of the present disclosure determine the commands 107 to the thrusters 103 (FIGS. 1B & 1C) and the control inputs 209 to the momentum exchange devices 105 so that the spacecraft 102 simultaneously stays within a box 166 (FIGS. 1C & 1E), has its Euler Angles 175 (FIG. 1E) remain within limits 176 (FIG. 1F), and unloads excess stored momentum. This is done by implementing an automatic outer-loop control system 127 that uses a model of the spacecraft 123 in conjunction with an inner-loop feedback control system 125. For example, some embodiments of the present disclosure determine control inputs for controlling thrusters of the spacecraft using an optimization of a cost function over a receding horizon subject to constraints 129 on a pose of the spacecraft and inputs to the thrusters 103 (FIGS. 1B & 1C) and generate appropriate control input commands 107. The pose of the spacecraft includes one or combination of an absolute or relative position and orientation of the spacecraft. In some embodiments of the present disclosure, the cost function includes a component for controlling the pose of the spacecraft and a component for unloading a momentum stored by the momentum exchange devices.

In some embodiments of the present disclosure include the inner-loop feedback control system 125 using sensor measurements 204 to determine the current orientation of the spacecraft and sends commands 209 to actuators 103, such as momentum exchange devices 105, in order to reduce the error between the current spacecraft orientation and the target orientation of the spacecraft. In some embodiments of the present disclosure, the inner-loop controller 125 applies proportional, integral, and derivative (PID) gains on the error between the current spacecraft orientation and the target orientation of the spacecraft as a feedback command 209 to the actuators 103. In other embodiments, the error between the current spacecraft orientation and the target orientation of the spacecraft may be reduced using adaptive attitude controllers that generate a feedback command 209 based on internal states that estimate uncertain spacecraft parameters, e.g. moments and products of inertia.

Still referring to FIG. 2, in some other embodiments, the inner-loop feedback control system 125 takes the form of an SO(3)-based attitude controller that encodes the error between the current spacecraft orientation and the target orientation of the spacecraft as a rotation matrix. The SO(3)-based attitude controller may provide almost-global asymptotic stability for attitude tracking problems, be an easily implementable feedback controller, and provide for disturbance rejection by providing infinite feedback gain at disturbance frequencies. The target orientation of the spacecraft may be an inertially-fixed orientation or it may be a specially changing orientation, e.g. one that evolves in a manner that always points at the Earth.

In some embodiments of the present disclosure, the outer-loop control system 127 achieves the control using a model predictive control (MPC) over a receding horizon. The MPC is based on an iterative, finite horizon optimization based on a model of the spacecraft including a component modeling the inner-loop feedback control, a set of objectives of the motion of the spacecraft, and constraints on the spacecraft propulsion system and motion, and has the ability to anticipate future events and consequently to take appropriate control actions. This is achieved by optimizing the operation of the spacecraft according the set of objectives, over a future finite time-horizon with prediction obtained according to the model of the spacecraft subject to constraints, and only implementing the control over the current timeslot.

Still referring to FIG. 2, for example, the constraints 129 can represent physical limitations of the spacecraft 102, safety limitations on the operation of the spacecraft, and performance limitations on a trajectory of the spacecraft. A control strategy for the spacecraft is admissible when the motion generated by the spacecraft for such a control strategy satisfies all the constraints. For example, at time t, the current state of the spacecraft is sampled and an admissible cost minimizing control strategy is determined for a relatively short time horizon in the future. Specifically, an online or real-time calculation determines a cost-minimizing control strategy until time t+T. After the first step of the control is implemented, the state is measured or estimated again and the calculations are repeated starting from the now current state, yielding a new control and new predicted state trajectory. The prediction horizon shifts forward, and for this reason MPC is also called receding horizon control.

Figure 3A:
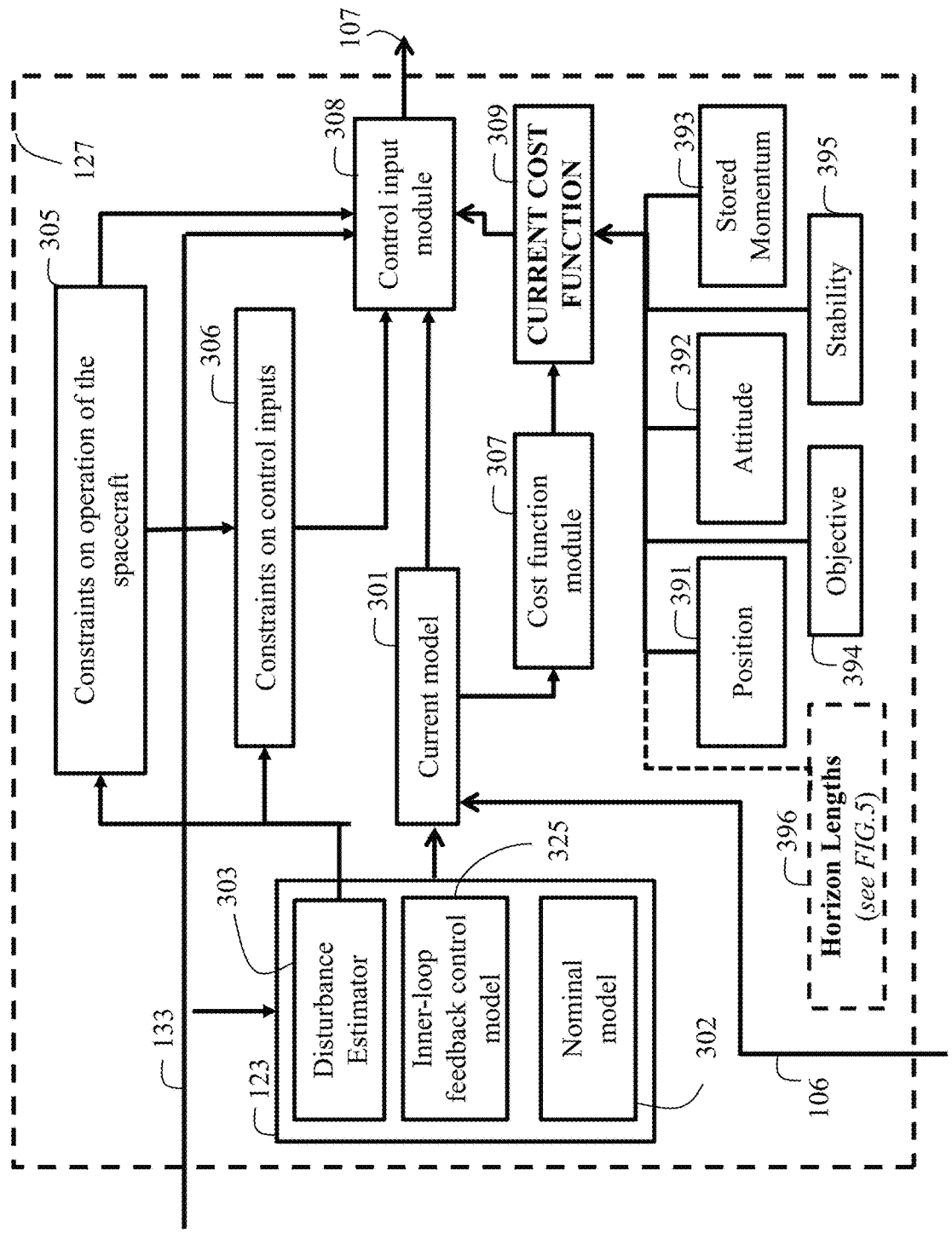
FIG. 3A is a block diagram illustrating some modules that can be part of the outer-loop control system, according to embodiments of the present disclosure.

FIG. 3A is a block diagram illustrating some modules that can be part of the outer-loop control system, according to embodiments of the present disclosure. For example, FIG. 3A shows the model 123 of the spacecraft including a nominal model 302 defining relationships among parameters of the model 123, such as the spacecraft orbital dynamics which governs translational motion of the spacecraft, and the spacecraft attitude dynamics and kinematics which governs attitude motion of the spacecraft. The model 123 also includes an inner-loop feedback control model 325 that allows the outer-loop to be able to predict the action taken by the inner-loop 325, and is based on the realization that the outer-loop control system 127 can command 107 (FIG. 2) the thrusters 103 (FIG. 1B & FIG. 1C) to behave in a manner that causes the inner loop control system 125 to command 109 (FIG. 2) the momentum exchange devices 105 (FIG. 1B & FIG. 1C) to unload their momentum.

The model 123 also includes a disturbance model 303 defining the disturbance forces 114 (FIG. 2) acting on the spacecraft 102. In some embodiments of the present disclosure, the disturbance forces 114 are determined as if the spacecraft 102 is located at a predetermined position, e.g., the desired position 165 (FIG. 1C &1E), for different time steps of the control, i.e., regardless of the actual position of the spacecraft. Those embodiments are based on a realization that such an approximation simplifies the computational complexity of the disturbance without a significant reduction of the accuracy. The disturbance module 303 enables the MPC to exploit natural dynamics to compensate for the disturbance forces, so that fuel consumption can be reduced while satisfying motion objectives of the spacecraft.

Still referring to FIG. 3A, some of the spacecraft quantities need to remain in desired ranges defined by constraints 305 on the operation of the spacecraft. For example, such quantities can include a pose of the spacecraft including position constraints derived from the requirement to maintain the spacecraft within the window 166 (FIG. 1C & FIG. 1E), and orientation constraints derived from the requirement to maintain the Euler Angles 175 (FIG. 1E) within limits 176.

Some embodiments of the present disclosure are based on the additional realization that constraints 306 on the control inputs are required in order to satisfy the operational limits of the spacecraft actuators, such as thrust magnitude limits. In some embodiments of the present disclosure, the constraints 306 are used in combination with at least some constraints 305 for controlling the spacecraft.

Still referring to FIG. 3A, in some embodiments of the present disclosure, the control inputs 107 are determined based on an optimization of a cost function 309 subject to constraints on the operation of the spacecraft 305 and constraints on the control inputs 306. In some embodiments of the present disclosure, the cost function includes a combination of multiple components, including a component 391 for the position of the spacecraft, a component 392 for the attitude of the spacecraft, a component 393 for the stored momentum, a component 394 for an objective of the operation of the spacecraft, and a component 395 for ensuring the stability of the operation of the spacecraft, and a component 396 which determines the horizon lengths (see FIG. 5). By selecting different combinations of the components of the cost function 306, some embodiments of the present disclosure determine a current cost function 309 adjusted for different objectives of the control.

For example, the component 391 for the position of the spacecraft penalizes a larger displacement 167 (FIG. 1C) of the spacecraft from the desired position 165 (FIG. 1C), so that the optimization of the cost function 309 results in control inputs that when applied to the spacecraft reduce the displacement 167 in order to help achieve the objective of remaining within the window 166 (FIG. 1C & FIG. 1E).

Still referring to FIG. 3A, the component 392 for the attitude of the spacecraft penalizes a larger magnitude of the Euler Angles 175 (FIG. 1E & FIG. 1F) of the spacecraft between the spacecraft-fixed reference frame 174 (FIG. 1E) and the desired reference frame, e.g. 171 (FIG. 1E), so that the optimization of the cost function 309 results in control inputs that when applied to the spacecraft reduce the Euler Angles 175 in order to help achieve the objective of maintaining a desired orientation for the spacecraft. These resulting control inputs may be commands that induce the thrusters to fire in a manner that directly reduces the Euler Angles 175 towards their objective, or may be commands that induce the thrusters 103 (FIG. 1B & FIG. 1C) to fire in a manner that influences the inner-loop control system to generate commands to the momentum exchange devices that help achieve the Euler Angle objective.

The component 393 for the stored momentum penalizes a larger magnitude of the stored momentum so that the optimization of the cost function 309 results in control inputs that when applied to the spacecraft unload the stored momentum, e.g., the high values of the reaction wheel spin rates are penalized, resulting in an optimization that produces control inputs to reduce the spin rates of the reaction wheels 105 (FIG. 1B & FIG. 1C). As the outer-loop control system does not directly command the momentum exchange devices and cannot directly unload the stored momentum, this control input would cause the thrusters to fire in a manner that would influence the inner-loop control system to unload the stored momentum.

Still referring to FIG. 3A, the component 394 for the objective of the operation of the spacecraft can, for example, include a penalty on the amount of fuel that the thrusters use in order that the optimization of the cost function 309 results in control inputs that use less fuel, or a penalty on a lower magnitude of the speed at which the spacecraft operates in order that the optimization of the cost function results in control inputs that cause the spacecraft to operate faster, i.e. achieve objectives in a shorter period of time.

The component 395 for the stability is determined such that the optimization of the cost function 309 results in control inputs that ensure the stability of the operation of the spacecraft. In one embodiment, where the desired orbit 160 (FIG. 1C & FIG. 1E) is circular, the stability component of the cost function penalizes the position of the spacecraft at the end of the MPC horizon by using the solution to the Discrete Algebraic Riccati Equation (DARE). In other embodiments, the desired orbit is not circular. For example, the desired orbit is elliptic, or otherwise non-circular and periodic. Then, the stability component penalizes the position of the spacecraft at the end of the MPC horizon by using the solution to the Periodic Differential Riccati Equation (PDRE). Note that the PDRE solution is not constant and thus the penalty for the current cost function 209 is selected to correspond to the PDRE solution at the time instant corresponding to the time at the end of the MPC horizon.

Still referring to FIG. 3A, in some embodiments of the present disclosure, each of the components 391-394 of the cost function 309 is weighted so that the optimization of the cost function produces control inputs that achieve the various individual component goals with priority corresponding to their relative weight.

For example, in one embodiment, the weights are selected so that the largest weight is given to the component 394 that penalizes the fuel that the thrusters use. As a result, this embodiment generates an operation of the spacecraft that prioritizes using the least amount of fuel possible at the expense of a larger average displacement 167 (FIG. 1C). In a different embodiment, the largest weight is given to the component 391, which penalizes the displacement 167 (FIG. 1C) from the desired position 165 (FIG. 1C & FIG. 1E). As a result, this embodiment generates an operation of the spacecraft that prioritizes maintaining a small average displacement 167 at the expense of using more fuel. In some embodiments of the present disclosure, the component 395 for stability has its weight defined according to the weight that generates a stabilizing control input.

Still referring to FIG. 3A, the processor 113 (FIG. 1B) of the control system 101 (FIG. 1B) executes various modules of the control system including a control input module 308 for determining force commands 107 to the spacecraft thrusters during a current iteration by optimizing the current cost function 309. The control input module optimizes the current cost function using a current model 301 of the spacecraft subject to constraints 305 on the operation of the spacecraft and constraints 306 on the current control input.

In one embodiment, the optimization of the cost function 309 in the control input module 308 is formulated as a quadratic program (QP). Quadratic programs can be solved more quickly and efficiently in resource-constrained hardware such as spacecraft, which have limited onboard computational power. In order to take advantage of quadratic programs, a linear-quadratic MPC (LQ-MPC) formulation is applied.

Still referring to FIG. 3A, for example, the control system also includes the current model module 301 for the linearization of the nominal model 302 at the desired target location 165 (FIG. 1B & FIG. 1C) on the target orbit, the linearization of the inner-loop feedback control model 302, and determination of the disturbance forces at the desired target location 165. In some embodiments of the present disclosure, the linearization is due to LQ-MPC making use of a linear prediction model. The module 301 determines the current model of the spacecraft for the current time instant and over the entire MPC horizon. The module 301 can also receive the current state of the spacecraft 106 (FIG. 1B) to determine a state of the spacecraft relative to the linearization.

The control system also includes a cost function module 307 for determining the current cost function 309. For example, the cost function module 307 updates the previous cost function based on change of the target operation of the spacecraft, e.g., a change in the desired motion 133, because different motions can necessitate different cost functions to have the quantities 205 for the spacecraft meet their desired objectives. Also, the cost function module can update the stability component 395 of the cost function if the desired orbit requires an updated weight based on the orbit. Because the steps of the control are performed iteratively, the current model and the current cost function become previous model and previous cost function for subsequent iteration. For example, the previous model, the previous cost function and the previous control input are determined at a previous iteration as the current model, the current cost function and the current control input.

Figure 3B:
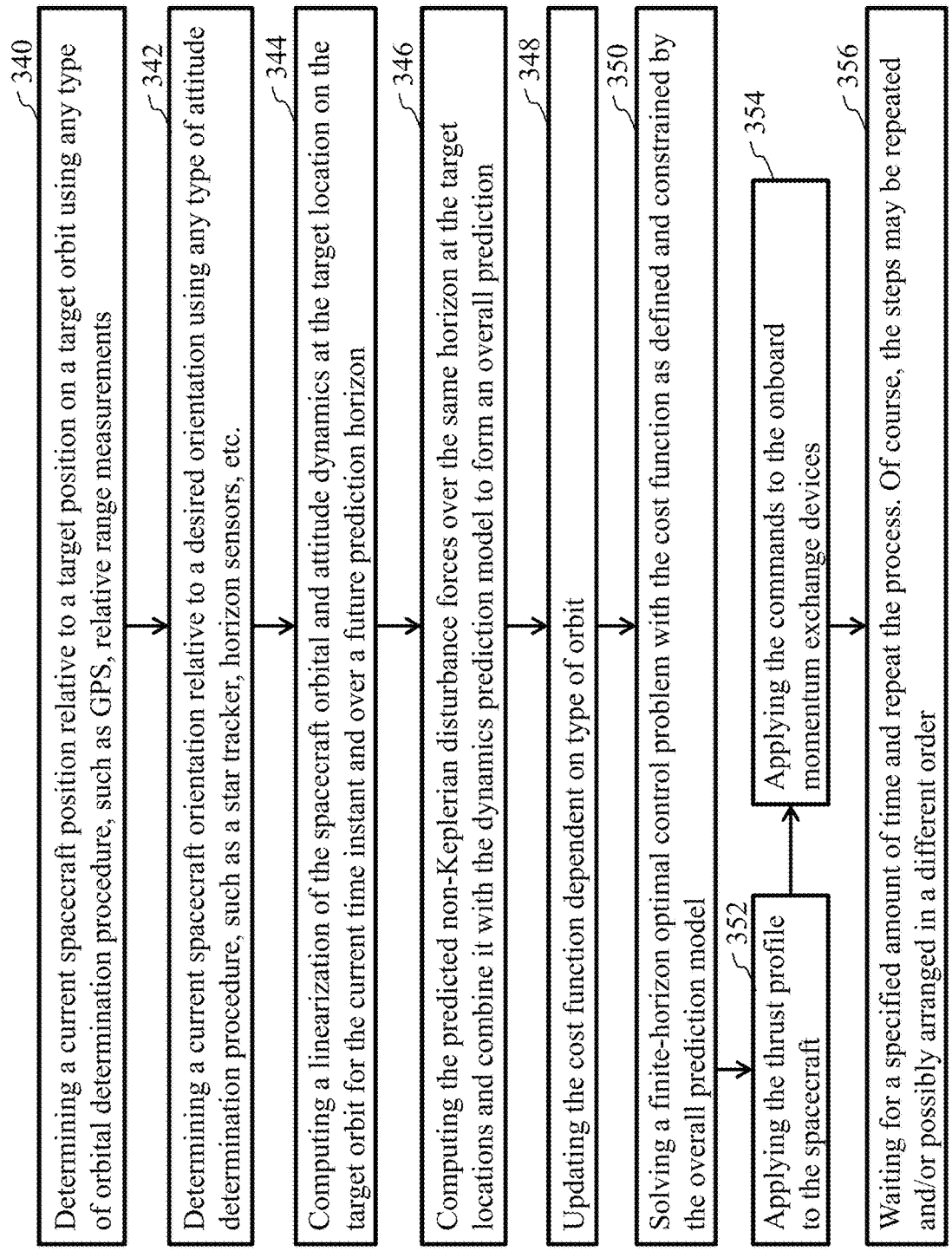
FIG. 3B is a block diagram illustrating a method for a control system to control the spacecraft to simultaneously stay within a station keeping box and unload excess stored momentum, according to embodiments of the present disclosure.

FIG. 3B is a block diagram illustrating a method for a control system to control the spacecraft to simultaneously stay within a station keeping box and unload excess stored momentum, according to embodiments of the present disclosure. During experimentation, the present disclosure realized that in order to control the spacecraft to simultaneously stay within a station keeping box and unload excess stored momentum, a control system can control the spacecraft according to some of the following repeating method steps:

Step 340 of FIG. 3B, includes determining a current spacecraft position relative to a target position on a target orbit using any type of orbital determination procedure, such as GPS, relative range measurements, etc.

Step 342 of FIG. 3B, can include determining a current spacecraft orientation relative to a desired orientation using any type of attitude determination procedure, such as a star tracker, horizon sensors, etc.

Step 344 of FIG. 3B, can include computing a linearization of the spacecraft orbital and attitude dynamics at the target location on the target orbit for the current time instant and over a future prediction horizon.

Step 346 of FIG. 3B, can include computing the predicted non-Keplerian disturbance forces over the same horizon at the target locations and combine it with the dynamics prediction model to form an overall prediction.

Step 348 of FIG. 3B, can include possibly updating the cost function dependent on type of orbit.

Step 350 of FIG. 3B, can include solving a finite-horizon optimal control problem with the cost function as defined and constrained by the overall prediction model, the station keeping and orientation requirements, the thruster-force-torque relationship, and the constraints on available thrust, to obtain forces, torques, and commands to the onboard momentum exchange devices.

Step 352 of FIG. 3B, can include applying the thrust profile to the spacecraft.

Step 354 of FIG. 3B, can include applying the commands to the onboard momentum exchange devices.

Step 356 of FIG. 3B, can include waiting for a specified amount of time and repeat the process. Of course, the steps may be repeated and/or possibly arranged in a different order.

Figure 4:
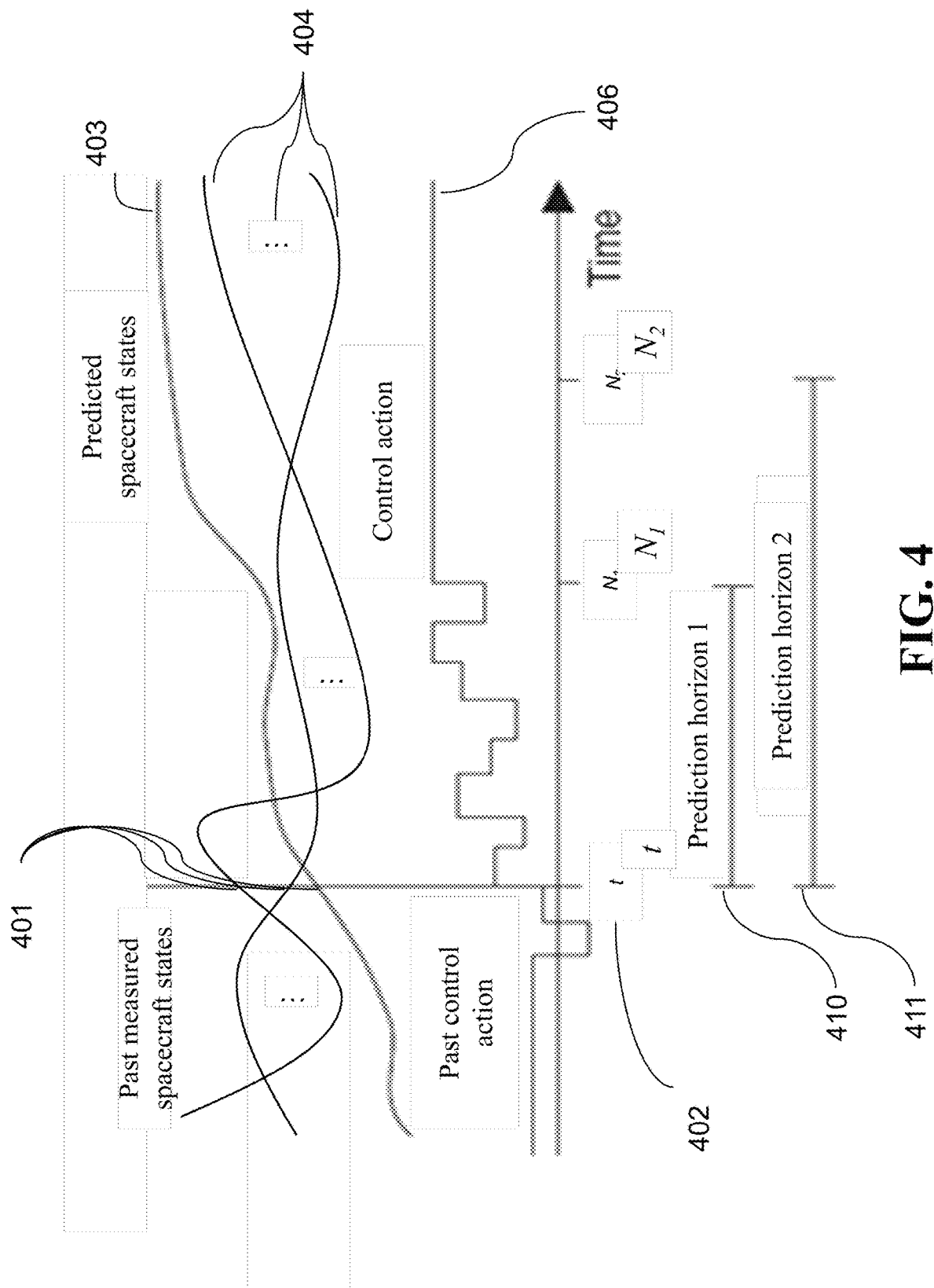
FIG. 4 is a schematic illustrating the predicted values of states of the spacecraft during multiple prediction horizons, according to embodiments of the present disclosure.

FIG. 4 shows a schematic illustrating a portion of the process as described above, in which the spacecraft states 401 are measured or estimated at the current time instance 402 and their values are predicted 403, 404 as part of the solution to a finite-horizon optimal control problem that obtains a sequence of control actions 406 to be applied to the spacecraft. In some embodiments of the present disclosure, the cost function of the optimal control problem utilizes different length finite receding horizons for different components of the spacecraft model in order to achieve delta-v efficient maneuvers. For example, states of the spacecraft model associated with the north-south station keeping 403 may be included in the cost function using a shorter horizon 410 than other states of the spacecraft model that are associated with east-west station keeping 404, orientation control 404, or accumulated onboard momentum management 404, which utilize a longer horizon 411. In other words, the cost function may include predictions of different states for different lengths of time into the future.

Segmenting the states of the satellite 401 into components that are optimized over various length horizons short 410 and long 411 may be done in order to generate more efficient control actions with respect to delta-v. This may be the case for a variety of reasons, none of which are obvious. The present disclosure through experimentation learned that the longer a prediction of a spacecraft model is into the future, which is the horizon of the optimization problem, and including optimizing a cost function of all of the spacecraft states over that horizon, the more optimal (i.e., fuel efficient) the control input solution will be with respect to delta-v. However, it should be noted that when formulating an optimization problem suitable for LQ-MPC as described in FIG. 3A, it is the case that the cost function and delta-v (fuel efficiency) are not the same thing. The cost function in general is not formulated to directly minimize fuel. Thus it may be the unintuitive case that a cost function that includes a long horizon for all of the spacecraft states does not provide for the most fuel efficient control inputs. Furthermore, LQ-MPC requires the linearization of the spacecraft dynamics as described in FIG. 3A. As with the cost function it may be the case that the linearized spacecraft model used to predict the spacecraft dynamics in the LQ-MPC is not equally accurate far into the future for all the spacecraft states. It may be the case that including a long horizon for states that are being predicted inaccurately causes error to accumulate in a manner that the prediction model becomes unreliable and control input calculations that are optimal with respect to the LQ-MPC cost function and linearized spacecraft model produce poor control inputs that are not the most fuel efficient.

It is observed to be the case that for certain states of the spacecraft model, e.g. states associated with north-south station keeping, shorter horizons produce more fuel efficient control inputs, whereas for other states of the spacecraft model, e.g. states of the spacecraft model that are associated with east-west station keeping, orientation control, or accumulated onboard momentum management, longer horizons produce more fuel efficient control inputs.

Figure 5:
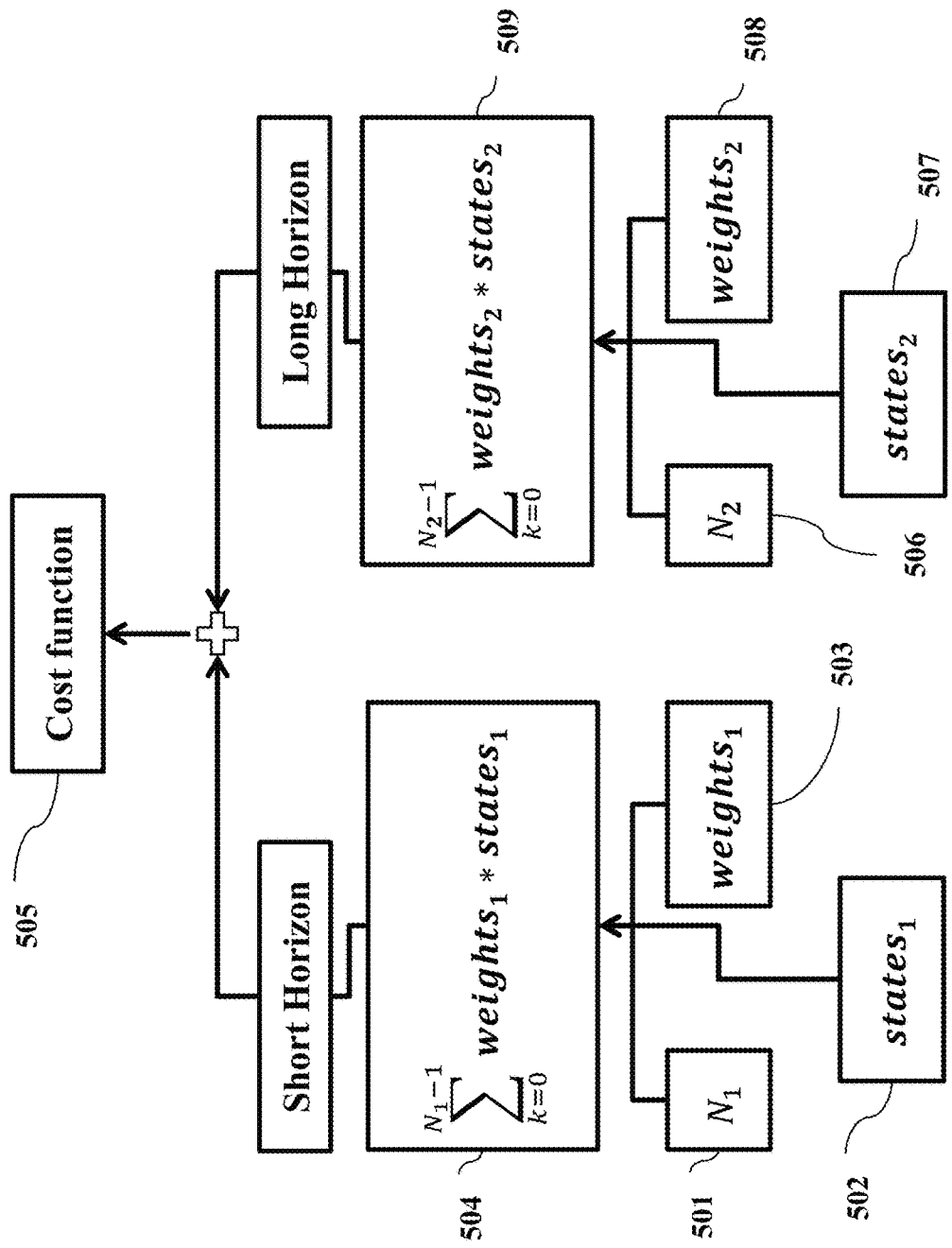
FIG. 5 is a block diagram illustrating a method for generating a cost function using two different prediction horizons, according to embodiments of the present disclosure.

FIG. 5 shows a method to combine the unintuitive result described above. The cost function 505 (FIG. 3A, 309), is built up of multiple components, such as position, attitude, stored momentum, etc., each of which is weighted according to relative importance as described in FIG. 3A. The cost function 505 may also be interpreted as composed of a combination of states 502 multiplied by weights 503 and summed together over a horizon 501 as given in the forming the formula 504. For the method described above with multiple horizons, all the spacecraft states will be grouped into states$_1$ 502 and states$_2$ 507. States$_1$ 502 will be multiplied by weights$_1$ 503 and summed together over a short horizon $N_1$ 501 as given in the forming the formula 504. States$_2$ 507 will be multiplied by weights$_2$ 508 and summed together over a long horizon $N_2$ 506 as given in the forming the formula 509. The formula for short horizon states 504 and the formula for the long horizon states 509 are summed together and form the overall cost function 505 which is then optimized to produce the control inputs. FIG. 5 can also be extended to include more than two groupings of states as needed to produce desirable control inputs.

Equations of the Spacecraft Model

According to an embodiment of the present disclosure, the spacecraft model 123 (FIG. 2) is determined for a nadir-pointing spacecraft in geostationary Earth orbit (GEO) equipped with four gimbaled electric thrusters 103 and three axisymmetric reaction wheels 105 attached to a rigid bus in an orthogonal and mass balanced configuration. A bus-fixed frame 174 (FIG. 1F) is defined for the spacecraft, and an inertial frame 171 (FIG. 1F) is specified for determining the attitude of the spacecraft. The spacecraft equations of motion are given by $$\ddot{r}_g^{cw} + \mu \frac{r_g^{cw}}{\|r_g^{cw}\|^3} = a_g^p + \frac{1}{m_B} f_g^{thrust}, \quad (1)$$
$$J_p^{Bc} \dot{\omega}_p^{pg} + \omega_p^{pg \times}(J_p^{Bc} \omega_p^{pg} + J_s \dot{\gamma}) + J_s \eta = \tau_p^p + \tau_p^{thrust},$$
$$\dot{C}_{pg} = -\omega_p^{pg \times} C_{pg},$$
$$\ddot{\gamma} = \eta.$$

where $r_g^{cw}$ is the position of the satellite, $q^{pg}$ is an attitude parametrization of $C_{pg}$ with is the rotation matrix of the bus frame relative to the inertial frame, and $\gamma$ is a column matrix containing the angle of rotation of each reaction wheel. The vector $\omega_p^{pq}$ is the angular velocity of the bus frame with respect to the inertial frame resolved in the bus frame. The matrix $J_p^{Bc}$ is the moment of inertia of the satellite B relative to its center of mass, resolved in the bus frame. The reaction wheel array has a moment of inertia $J_s$ and the wheels are controlled with an acceleration $\eta$. The term $a_g^p$ represents the external perturbations on the satellite due to Earth's non spherical gravitational field, solar and lunar gravitational attraction, solar radiation pressure (SRP), and are defined below in (4). The term $\tau_p^p$ represents the perturbation torques due to the solar radiation pressure, which assumes total absorption and is given by $$\tau_p^p = -c_p \left[ r_p^{p_ic} \sum_{i=1}^{N_s} n_p^{iT} \hat{r}_p^{sc} \right]^\times \hat{r}_p^{sc} \quad (2)$$

where $c_p$ is the effective SRP near the Earth, $\hat{r}_p^{sc}$ is a unit vector pointing towards the sun from the center of mass of the spacecraft, $p_i$ is the center of pressure of one of the six sides of the satellite, $r_p^{p_ic}$ is the position of the center of pressure of the i-th panel relative to the center of mass of the satellite, and $n_p^i$ is the normal vector of the i-th panel resolved in the bus frame. The value $N_s$ is the number sun-facing panels. Only sun-facing panels contribute to the torque. The gimbaled electric thrusters 150 produce forces that provide a net force on the spacecraft given by $$f_g^{thrust} = \sum_{i=1}^{4} f_g^{t_i} = C_{pg}^T \sum_{i=1}^{4} C_{ip}^T f_i^{t_i}. \quad (3)$$

They also produce a net torque on the spacecraft given by $$\tau_p^{thrust} = \sum_{i=1}^{4} r_p^{t_ic \times} C_{ip}^T f_i^{t_i}. \quad (4)$$

In one embodiment, the inner-loop control system 108 is an SO(3)-based attitude controller, where the feedback law controlling the reaction wheel array in (1) is given by $$\eta = -J_s^{-1}(v_1 + v_2 + v_3) \quad (11)$$

where $$v_1 = \omega_p^{pg \times}(J_p^{Bc} \omega_p^{pg} + J_s \dot{\gamma}) - J_p^{Bc}(K_1 \dot{S} + \tilde{\omega}^\times \omega_p^{pg}), \quad (12)$$
$$v_2 = -\hat{\tau}_{dist},$$
$$v_3 = -K_v(\tilde{\omega} + K_1 S) - K_p S,$$
$$\dot{\hat{d}} = A_d \hat{d} + B_d(\omega_p^{pd} + K_1 S),$$
$$\hat{\tau}_{dist} = C_d \hat{d},$$

and

This SO(3) inner-loop attitude controller makes use of the following quantities $$S = -\mathcal{P}_a(C_{pd})^v,$$
$$\dot{S} = \mathcal{P}_a(\omega_p^{pd \times} C_{pd})^v,$$
$$\omega_p^{pd} = \omega_p^{pg} - C_{pd} \omega_d^{dg},$$

where $\mathcal{P}_a$ is a skew-symmetric projection operator, $(\bullet)^v$:so $(3) \to \mathbb{R}^3$: is the uncross operator un-mapping a skew-symmetric matrix into a three dimensional vector, and $K_1$, $K_v$, and $K_p$ are gains.

In other embodiments, the equations in (1) are substituted for equations that govern a spacecraft in other orbits and with other momentum exchange devices other than reaction wheels.

In one embodiment, the model (1) is linearized to form a current prediction model 301 (FIG. 3A). The attitude-error rotation matrix $\tilde{R} = R^T R_d$ is parameterized using the set of 3-2-1 Euler angles $(\psi, \theta, \varphi)$ as $\tilde{R} = C_1(\varphi) C_2(\theta) C_3(\psi)$, where $R_d$ is the desired attitude trajectory, and $C_1$, $C_2$, and $C_3$ are elementary rotations about the x, y, and z-axes by $\psi$, $\theta$, and $\varphi$, respectively. The linearization of the attitude dynamics and kinematics about an equilibrium spin with an angular rate corresponding to the mean motion n of the orbit, along with the linearization of the motion of the spacecraft for small maneuvers around a nominal circular orbit, is given by $$\delta\ddot{r} = -\Omega\delta r - 2\omega_0^\times \delta\dot{r} + a_h^p + \frac{1}{m_B}C_{dh}^T\sum_{i=1}C_{ip}^T f_i^{t_i}$$

$$\delta\dot{\theta} = -\omega_0^\times \delta\theta + \delta\omega$$

$$\delta\dot{\omega} = -J_p^{Bc^{-1}}(\omega_0^\times J_p^{Bc} - (J_p^{Bc}\omega_0)^\times)\delta\omega -$$

$$J_p^{Bc^{-1}}\omega_0^\times J_s\delta\gamma - J_p^{Bc^{-1}}J_s\eta + \sum_{i=1}^{4}r_p^{t_i c^\times}C_{ip}^T f_i^{t_i}.$$

where $\delta x$, $\delta y$ and $\delta z$ are the components of the relative position vector $\delta r$ of the spacecraft relative to the nominal location 165, $\omega$=diag $\{-3n^2,0,n^2\}$, $n=\sqrt{\mu/R_0^3}$ is the mean motion of the nominal orbit, $\delta\omega=[\delta\omega_1, \delta\omega_2, \delta\omega_3]$ is the relative angular velocity components of the spacecraft, and $\delta\theta=[\delta\varphi, \delta\theta, \delta\psi]$ is the relative Euler angles of the spacecraft. That is, they are quantities that represent the error from the desired spacecraft angular velocity components and desired Euler angles.

For embodiments that utilize an inner-loop attitude control, the linearization of (1) along with the inner-loop control law (11), is used as the inner-loop feedback control model 325 (FIG. 3A) as part of the prediction based on the model 123. This gives the changed relative angular velocity equation $$\delta\dot{\omega} = \tau_p^{thrust} + \underbrace{[-K_1 + \omega_0^\times - J_p^{Bc^{-1}}K_v]\delta\omega}_{K_{d2}} -$$

$$J_p^{Bc^{-1}}C_d\hat{d} + \underbrace{[K_1\omega_0^\times - \omega_0^\times\omega_0^\times + J_p^{Bc^{-1}}(K_v\omega_0^\times - K_vK_1 - K_p)]\delta\theta}_{K_{p2}},$$

and the additional linearized equations based on (12) given by $$\dot{\hat{d}} = A_d\hat{d} + B_d\delta\omega + B_d(K_1 - \omega_0^\times)\delta\theta,$$

$$\hat{\tau}_{dist} = C_d\hat{d}.$$

For embodiments in which a spacecraft is in GEO, the main perturbation accelerations are due to solar and lunar gravitational attraction, solar radiation pressure, and the anisotropic geopotential, that is, Earth's non-spherical gravitational field. Analytic expressions for these perturbation forces per unit mass, i.e., the disturbance accelerations, are given, respectively, by $$\vec{a}_{sun} = \mu_{sun}\left(\frac{\vec{r}_{sun/sc}}{r_{sun/sc}^3} - \frac{\vec{r}_{sun/earth}}{r_{sun/earth}^3}\right), \quad (4)$$

$$\vec{a}_{moon} = \mu_{moon}\left(\frac{\vec{r}_{moon/sc}}{r_{moon/sc}^3} - \frac{\vec{r}_{moon/earth}}{r_{moon/earth}^3}\right),$$

-continued $$\vec{a}_{srp} = C_{srp}\frac{S(1 + c_{refl})}{2m}\frac{\vec{r}_{sc/sun}}{r_{sc/sun}^3},$$

$$\vec{a}_{J_2} = \frac{3\mu J_2\rho_E^2}{2r^5}\left(\left(5\frac{(\vec{r}\cdot\hat{k}_E)}{r^2} - 1\right)\vec{r} - 2(\vec{r}\cdot\hat{k}_E)\hat{k}_E\right),$$

where $\vec{(\cdot)}$ denotes a coordinate-free (unresolved) vector, $\mu$sun and $\mu$moon are the gravitational constants of the sun and moon, $C_{srp}$ is the solar radiation pressure constant, S is the solar-facing surface area, $c_{refl}$ is the surface reflectance, $\rho_E$ is Earth's equatorial radius, $\hat{k}_E$ is the z-axis unit vector of the Earth-centered inertial frame, and $J_2$ is the dominant coefficient in the considered geopotential perturbation model, where additional higher order terms are ignored. The sum of the individual disturbance accelerations in (4) yields the total disturbance acceleration considered in (1).

In some embodiments of the present disclosure, a state-space model is given by $$\dot{x}(t) = A_c x(t) + B_c u(t) \quad (5)$$

where $$x = [\delta r^T \delta\dot{r}^T \delta\theta^T \delta\omega^T \delta\gamma^T \hat{d}^T]^T \quad (6)$$

$$u = [f_1^{t_1} f_2^{t_2} f_3^{t_3} f_4^{t_4}]^T \quad (7)$$

In order to be used as a prediction model in the MPC policy, (5) is discretized with a sampling period of $\Delta T$ sec which yields $$x_{k+1} = Ax_k + Bu_k, \quad (8)$$

where $x_k$ is the state at time step $k \in Z^+$, $u_k$ is the control vector at the time step $k \in Z^+$, and $A = \exp(A_c\Delta T)$, $b = \int_0^{\Delta T}\exp(A_c(\Delta T - r))d\tau B_c$ are the discretized matrices obtained based on the continuous-time system realization ($A_c$, $B_c$) in (5).

Estimation of the Disturbances Acting on the Spacecraft

In some embodiments of the present disclosure, the model (8) is augmented with a prediction model of the disturbance accelerations (4), obtaining $$x_{k+1} = Ax_k + Bu_k + O_{H/E}a_{p,k}, \quad (9)$$

where $a_{p,k}$ is the total disturbance acceleration predicted at time step k based on propagation of the desired position 165 (FIG. 1B & FIG. 1C), and $O_{H/E}$ is the rotation matrix that transforms the components of $a_p,k$ from the inertial frame 171 (FIG. 1F) into the components of the same acceleration in the desired reference frame 170 (FIG. 1C).

The desired position 165 (FIG. 1B & FIG. 1C) for disturbance-acceleration prediction is used in (9) due to the nonlinearity of the analytical expressions in (4).

Figure 6:
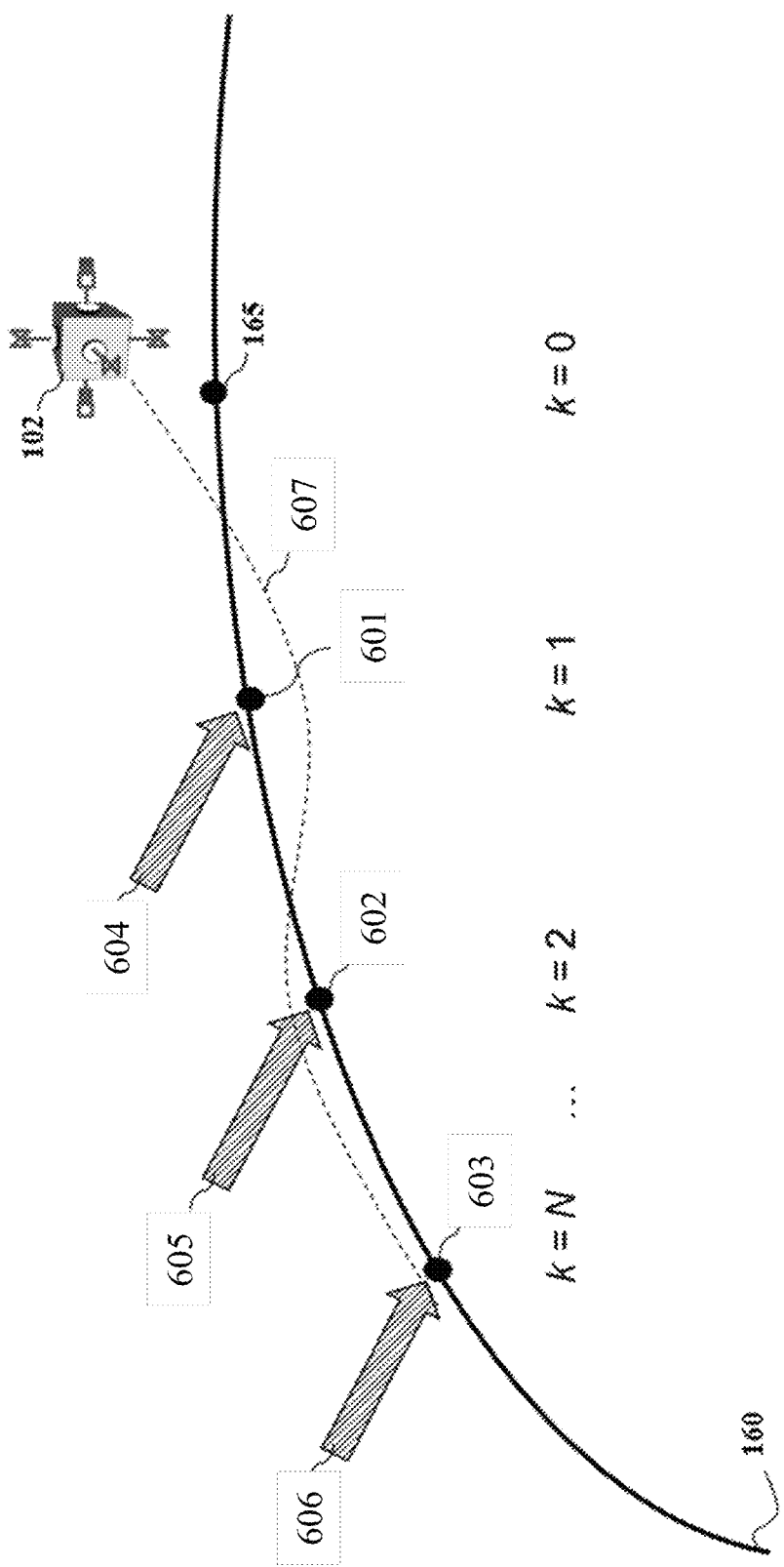
FIG. 6 is a schematic of the disturbance prediction problem, according to embodiments of the present disclosure.

FIG. 6 shows the spacecraft 102 displaced from its desired position 165 at time step k=0. Because the desired positions 601, 602, and 603 on the nominal orbit 160 at time steps k=1, k=2, . . . , k=N are known in advance, $a_{p,k}$ can be predicted based on the analytical expressions (4) at time steps k=1, k=2, . . . , k=N from the disturbance forces 604, 605, and 606. As the spacecraft position is to be constrained in a tight window 166, the difference in the disturbance accelerations at the desired positions 601, 602, and 603 and at the true satellite position 707, which is unknown in advance, is negligible. Accordingly, some embodiments of the present disclosure determine the disturbance forces as if the spacecraft is located at the target position for the entire period of the receding horizon.

Constraints on Operation of the Spacecraft

In some embodiments of the present disclosure, constraints 129 (FIG. 2) on the operation of the spacecraft are imposed, at least in part, by δy and δz, corresponding to a station keeping window 166 using the relations $$|\delta y| \leq r_0 \tan(\lambda_{1,max}), \quad (10a)$$

$$|\delta z| \leq r_0 \tan(\lambda_{2,max}), \quad (10b)$$

where $\lambda_{1,max}$ is the maximum tolerable longitude error, and $\lambda_{2,max}$ is the maximum tolerable latitude error.

In some embodiments of the present disclosure, the thrusters 103 may be gimbaled in order to allow them to rotate a fixed amount from their nominal alignment with a spacecraft frame 174. Individual thrusters, however, have limited gimbal range of motion and are therefore constrained to lie in the interior of four planes that form a pyramid 183. This constraint is given by $$D_i f_i^{ti} \geq 0, \quad (13)$$

where each of the four rows of $D_i$ contains a normal vector describing a plane.

In some embodiments of the present disclosure, the relative Euler angles ($\delta\varphi$, $\delta\theta$, $\delta\psi$) are constrained to be within a small tolerance, $$|\delta\varphi| \leq \delta\varphi_{max}, \ |\delta\theta| \leq \delta\theta_{max}, \ |\delta\psi| \leq \delta\psi_{max}, \quad (14)$$

in order maintain the spacecraft orientation, even while unloading excess stored momentum.

Cost Function Objectives

In some embodiments of the present disclosure, the current cost function 309 (FIG. 3A) is composed of costs associated with various objectives, e.g. an objective $J_1$ that quantifies displacement from the nominal orbital position, an objective $J_2$ that quantifies the error in the Euler angles and penalizes the spacecraft angular velocity components, an objective $J_3$ that penalizes usage of the thrusters to generate forces and torques, and an objective $J_4$ that penalizes the reaction wheel momentum. In some embodiments of the present disclosure, these costs $J_1$-$J_4$ are given by $$J_1 = (\delta x)^2 + (\delta y)^2 + (\delta z)^2$$

$$J_2 = (\delta\varphi)^2 + (\delta\theta)^2 + (\delta\psi)^2 + (\delta\omega_1)^2 + (\delta\omega_2)^2 + (\delta\omega_3)^2$$

$$J_3 = (F_x)^2 + (F_y)^2 + (F_z)^2 \alpha (\tau_1)^2 + (\tau_2)^2 + (\tau_3)^2$$

$$J_4 = (\eta_1)^2 + (\eta_2)^2 + (\eta_3)^2$$

Each objective $J_1$-$J_4$ is multiplied by a weight $w_i$ and combined into a total cost function $J_{tot}$, $$J_{tot} = \Sigma_{i=1,\ldots,4} w_i J_i. \quad (18)$$

The weight $w_i$ assigned to each objective determines its relative importance. The larger the weight assigned to given objective, the more that objective takes precedence when the cost function is optimized.

Based on (6) and (7), $J_{tot}$ can be written for the state-space formulation as $$J_{tot} = x^T Q x + u^T R u, \quad (19)$$

where Q and R are symmetric positive definite weighting matrices that encode the weights $w_i$ assigned to each objective and may further modify or add additional weights such as cross-weights that are not evident from the component formulation (18).

Stability Objective of the Cost Function

In some embodiments of the present disclosure, where the desired orbit is not circular, for example elliptic, or otherwise non-circular and periodic, then the model 123 (FIG. 3A) of the spacecraft motion about that orbit may be linear and time-varying. In such embodiments, the component 395 (FIG. 3A) of the cost function 309 (FIG. 3A) for the stability is determined based on the solution to the Periodic Difference Riccati Equation (PDRE)

$$P_k = Q_k + A_k^T P_{k+1} A_k - A_k^T P_{k+1} B_k (R_k + B_k^T P_{k+1} B_k)^{-1} B_k^T P_{k+1} A_k \quad (15)$$

where $A_k$, $B_k$ are the matrices of the model 123 at time step k, and $P_k$, $Q_k$, and $R_k$ are symmetric positive definite weighting matrices. The matrices $Q_k$ and $R_k$ are taken to be the same as the weighting matrices in (19).

For embodiments where the linearization is time-invariant, such as motion around a nominal circular orbit, e.g. GEO, the component 395 (FIG. 3A) for the stability is determined based on the solution to the Discrete Algebraic Riccati Equation (DARE)

$$P = Q + A^T P A - A^T P B (R + B^T P B)^{-1} B^T P A \quad (16)$$

where A, B are the matrices of the model in (8), and P, Q, and R, are symmetric positive definite weighting matrices. As above, the matrices Q and R are taken to be the same as the weighting matrices in (19).

Control Input Computation

In some embodiments of the present disclosure, the control input module 308 (FIG. 3A) takes the form of a finite horizon numerical optimization problem with multiple horizons such as, $$\min_{U_t} x_{N_1|t}^T P_1 x_{N_1|t} + \sum_{k=0}^{N_1-1} (x_{k|t}^T Q x_{k|t} + u_{k|t}^T R u_{k|t}) + \\ x_{N_2|t}^T P_2 x_{N_2|t} + \sum_{k=N_1}^{N_2-1} (x_{k|t}^T Q_2 x_{k|t} + u_{k|t}^T R u_{k|t}), \quad (17)$$

subject to $$x_{k+1|t} = A_d x_{k|t} + B_d u_{k|t} + B_{w,d} w_{k|t},$$

$$x_{0|t} = x(t),$$

$$w_{k|t} = \hat{w}_t(t+k),$$

$$x_{min} \leq x_{k|t} \leq x_{max}, \ 0 \leq k \leq N_1,$$

$$x_{min,2} \leq x_{k|t} \leq x_{max,2}, \ N_1 < k \leq N_2,$$

$$u_{min} \leq u_{k|t} \leq u_{max},$$

which is formed from the current cost function 309 (FIG. 3A), the current linearized spacecraft model 123 that predicts the evolution of the state over the horizon using (9), and the spacecraft constraints 306 (FIG. 3A) using (10), (13), and (14), where $N_1$ is the prediction horizon of the states $\delta r_{h3}^{cw}$ and $\delta \dot{r}_{h3}^{cw}$, $N_2$ is the prediction horizon of the remaining states, $U_t = \{u_{0|t}, \ldots, u_{N_2-1|t}\}$, $Q = Q^T \geq 0$ and $R = R^T > 0$ are constant state and control weighting matrices, and $\hat{w}_t(j)$ is the open-loop predicted disturbance column matrix at time j based on date at time i. The matrix $Q_2$ is the same as Q, except the rows and columns associated with the states $\delta r_{h3}^{cw}$ and $\delta \dot{r}_{h3}^{cw}$ are set to zero. The matrices $P_1$ and $P_2$ are constructed from the matrix $P = P^T > 0$, which is the solution to the Discrete Algebraic Riccati Equation (DARE). The matrix $P_1$ contains the rows and columns of P associated with the states $\delta r_{h3}^{cw}$ and $\delta \dot{r}_{h3}^{cw}$ and zeros the others, while $P_2$ does the opposite, so that $P_1 + P_2 = P$. This is possible since P is block-diagonal under a coordinate transformation that reorders the state such that the states $\delta r_{h3}^{cw}$ and $\delta \dot{r}_{h3}^{cw}$ are at the end of the state column matrix. The state constraints $x_{min,2}$ and $x_{max,2}$ are identical to $x_{min}$ and $x_{max}$, except they do not contain any constraints on the states $\delta r_{h3}^{cw}$ and $\delta \dot{r}_{h3}^{cw}$. The problem (17) is solved using a numerical solver, which finds the input sequence $U=[u_1 \ldots u_N]^T$ that minimizes the current cost function subject to the problem constraints. The control input is selected as $u(t+j)=u^*_{j|t}$, $j=0, \ldots, N_{fb}-1$, where $u^*_{j|t}$ is the $i^{th}$ element of $U^*_t$, the minimizer of the objective function, and $N_{fb}$ is the number of time steps between feedback.

The first input $u_1$ in the input sequence is considered as the output 107 of the input computation 208. The input $u_1$ is combined with the output of the inner-loop feedback control 109 which constructs the commands 104 to the thrusters and the momentum exchange devices. At the next time step, t+1 a the model and cost function are updated, the state is updated, and the numerical optimization problem is solved again.

Features

According to aspects of the present disclosure, the accumulated cost over the first horizon is a sum of a set of weights multiplying states associated with the north-south dynamics of the spacecraft, such that the dynamics are associated with a motion of the spacecraft. The accumulated cost over the second horizon is a sum of a set of weights multiplying states associated with the east-west dynamics of the spacecraft, such that the dynamics are associated with a motion of the spacecraft. wherein the accumulated cost over the second horizon further includes a model of dynamics of the momentum exchange devices of the spacecraft effecting a total orientation of the spacecraft.

Another aspect of the present disclosure can include the cost function includes a component for the pose of the spacecraft penalizing a displacement of the spacecraft from a target pose and a component for a momentum stored by the momentum exchange devices penalizing a larger value of a magnitude of the stored momentum. The model of dynamics of momentum exchange devices of the spacecraft can include dynamics of inner-loop control of the momentum exchange devices, wherein the model of dynamics of the spacecraft includes the dynamics of the inner-loop control, such that the solution of the MPC controller accounts for effects of actuation of the momentum exchange devices according to the inner-loop control. Wherein the inner-loop control reduces an error between the orientation of the spacecraft and a target orientation of the spacecraft, wherein the solution of the MPC controller specifies angles and magnitude of the thrusts of the thrusters to reduce speed of the momentum exchange devices. Another aspect can include the model of dynamics of the spacecraft includes a linear nominal model defining relationships among parameters of the model and a disturbance model defining disturbance forces acting on the spacecraft located at a target position for the entire period of the receding horizon.

Another aspect of the present disclosure regarding the vehicle can include the another partial position being a remainder complement of positions to the partial position. An aspect can be that the accumulated cost over the first horizon is a sum of a set of weights multiplying states associated with the partial position dynamics of the vehicle, such that the dynamics are associated with a motion of the vehicle. Wherein the accumulated cost over the second horizon is a sum of a set of weights multiplying states associated with the another partial position dynamics of the vehicle, such that the dynamics are associated with a motion of the vehicle.

It is possible that the vehicle is one of a car, a boat, an airplane or a spacecraft. If a spacecraft, then can include a spacecraft bus and a set of thrusters for changing a pose of the spacecraft, wherein at least two thrusters are mounted on a gimbaled boom assembly connecting the two thrusters with the spacecraft bus, such that the two thrusters are coupled thrusters sharing the same gimbal angle, wherein the set of thrusters are the set of actuators, and the spacecraft also includes a set of momentum exchange devices for absorbing disturbance torques acting on the spacecraft.

Figure 7:
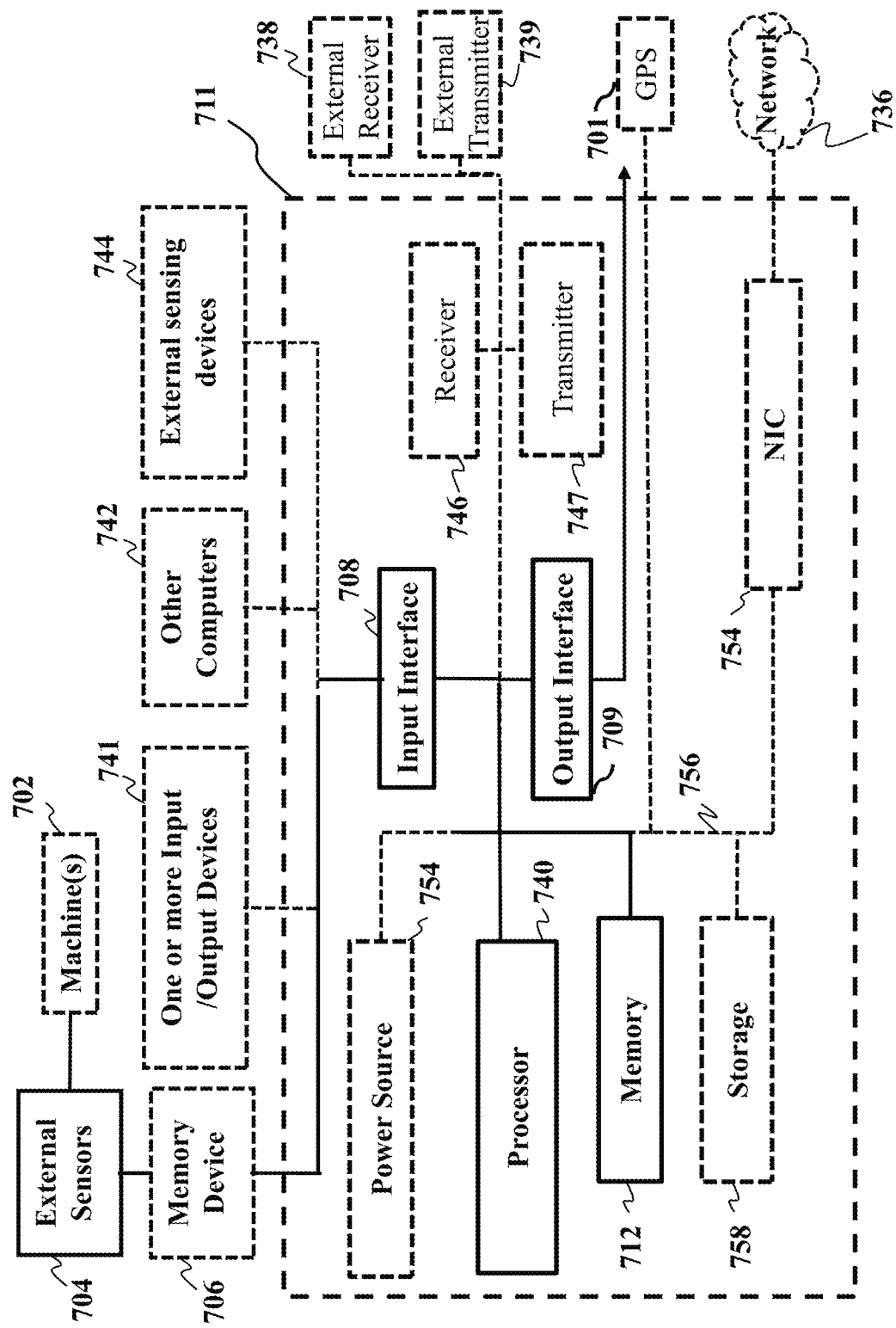
FIG. 7 is a block diagram of illustrating the method of FIG. 1A, that can be implemented using an alternate computer or processor, according to embodiments of the present disclosure.

FIG. 7 is a block diagram of illustrating the method of FIG. 1A, that can be implemented using an alternate computer or processor, according to embodiments of the present disclosure. The computer 711 includes a processor 740, computer readable memory 712, storage 758 connected through bus 756.

Contemplated is that the memory 712 can store instructions that are executable by the processor, historical data, and any data to that can be utilized by the methods and systems of the present disclosure. The processor 740 can be a single core processor, a multi-core processor, a computing cluster, or any number of other configurations. The processor 740 can be connected through a bus 756 to one or more input and output devices. The memory 712 can include random access memory (RAM), read only memory (ROM), flash memory, or any other suitable memory systems.

Still referring to FIG. 7, a storage device 758 can be adapted to store supplementary data and/or software modules used by the processor. For example, the storage device 758 can store historical device data and other related device data such as manuals for the devices, wherein the devices are sensing device capable of obtaining measured data as mentioned above regarding the present disclosure. Additionally, or alternatively, the storage device 758 can store historical data similar to sensor data. The storage device 758 can include a hard drive, an optical drive, a thumb-drive, an array of drives, or any combinations thereof.

The computer 711 can include a power source 754, depending upon the application the power source 754, such as a solar device or other environmental related power supplies, may be optionally located outside of the computer 711. A network interface controller (NIC) 754 is adapted to connect through the bus 756 to a network 736, wherein sensor data or other data, among other things.

Still referring to FIG. 7, the sensor data or other data, among other things, can be transmitted over a communication channel of the network 736, and/or stored within the storage system 758 for storage and/or further processing. Further, the sensor data or other data may be received wirelessly or hard wired from a receiver 746 (or external receiver 738) or transmitted via a transmitter 747 (or external transmitter 739) wirelessly or hard wired, the receiver 746 and transmitter 747 are both connected through the bus 756. The computer 711 may be connected via an input interface 708 to external sensing devices 744 and external input/output devices 741. The computer 711 may be connected to other external computers 742, an external memory 706 connected to external sensors 704 and machines 702. An output interface 709 may be used to output the processed data from the processor 740. A GPS 701 can be connected to the bus 756.

Embodiments

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A spacecraft comprising:
a spacecraft bus;
a set of thrusters for changing a pose of the spacecraft, wherein at least two thrusters are mounted on a gimbaled boom assembly connecting the two thrusters with the spacecraft bus, such that the two thrusters are coupled thrusters sharing the same gimbal angle;
a set of momentum exchange devices for absorbing disturbance torques acting on the spacecraft;
a model predictive controller (MPC) to produce a solution for controlling thrusters of the spacecraft by optimizing a cost function over multiple receding horizons, wherein the cost function is composed of a cost accumulated over the multiple receding horizons, such that the cost accumulated over the multiple receding horizon includes a cost accumulated over a first horizon using a dynamics governing a north-south position of the spacecraft, and a cost accumulated over a second horizon using a model of dynamics of the spacecraft governing an east-west position, where the first horizon is shorter than the second horizon; and
a thruster controller to operate the thrusters according to their corresponding signals.

2. The spacecraft of claim 1, wherein the accumulated cost over the first horizon is a sum of a set of weights multiplying states associated with the north-south dynamics of the spacecraft.

3. The spacecraft of claim 2, wherein the dynamics are associated with a motion of the spacecraft.

4. The spacecraft of claim 1, wherein the accumulated cost over the second horizon is a sum of a set of weights multiplying states associated with the east-west dynamics of the spacecraft, such that the dynamics are associated with a motion of the spacecraft.

5. The spacecraft of claim 1, wherein the accumulated cost over the second horizon further includes a model of dynamics of the momentum exchange devices of the spacecraft effecting a total orientation of the spacecraft.

6. The spacecraft of claim 1, wherein the cost function includes a component for the pose of the spacecraft penalizing a displacement of the spacecraft from a target pose and a component for a momentum stored by the momentum exchange devices penalizing a larger value of a magnitude of the stored momentum.

7. The spacecraft of claim 1, wherein the model of dynamics of momentum exchange devices of the spacecraft includes dynamics of inner-loop control of the momentum exchange devices, wherein the model of dynamics of the spacecraft includes the dynamics of the inner-loop control, such that the solution of the MPC controller accounts for effects of actuation of the momentum exchange devices according to the inner-loop control.

8. The spacecraft of claim 7, wherein the inner-loop control reduces an error between the orientation of the spacecraft and a target orientation of the spacecraft, wherein the solution of the MPC controller specifies angles and magnitude of the thrusts of the thrusters to reduce speed of the momentum exchange devices.

9. The spacecraft of claim 1, wherein the model of dynamics of the spacecraft includes a linear nominal model defining relationships among parameters of the model and a disturbance model defining disturbance forces acting on the spacecraft located at a target position for the entire period of the receding horizon.

10. A vehicle comprising:
a model predictive controller (MPC) to produce a solution for controlling actuators of the vehicle by optimizing a cost function over multiple receding horizons, wherein the cost function is composed of a cost accumulated over the multiple receding horizons, such that the cost accumulated over the multiple receding horizon includes a first horizon using a dynamics governing a partial position of the vehicle, and a cost accumulated over a second horizon using a model of dynamics of the vehicle governing another partial positions, where the first horizon is shorter than the second horizon; and
an actuator controller to operate the actuators according to their corresponding signals.

11. The vehicle of claim 10, wherein the another partial position is a remainder complement of positions.

12. The vehicle of claim 10, wherein the accumulated cost over the first horizon is a sum of a set of weights multiplying states associated with the partial position dynamics of the vehicle, such that the dynamics are associated with a motion of the vehicle.

13. The vehicle of claim 10, wherein the accumulated cost over the second horizon is a sum of a set of weights multiplying states associated with the another partial position dynamics of the vehicle, such that the dynamics are associated with a motion of the vehicle.

14. The vehicle of claim 10, wherein the vehicle is one of a car, a boat, an airplane or a spacecraft.

15. The vehicle of claim 13, wherein the spacecraft includes a spacecraft bus and a set of thrusters for changing a pose of the spacecraft, wherein at least two thrusters are mounted on a gimbaled boom assembly connecting the two thrusters with the spacecraft bus, such that the two thrusters are coupled thrusters sharing the same gimbal angle, wherein the set of thrusters are the set of actuators, and the spacecraft also includes a set of momentum exchange devices for absorbing disturbance torques acting on the spacecraft.

16. A spacecraft including a spacecraft bus and a set of thrusters for changing a pose of the spacecraft, wherein at least two thrusters are mounted on a gimbaled boom assembly connecting the two thrusters with the spacecraft bus, such that the two thrusters are coupled thrusters sharing the same gimbal angle, the spacecraft also including a set of momentum exchange devices for absorbing disturbance torques acting on the spacecraft, the spacecraft comprising:
a model predictive controller (MPC) to produce a solution for controlling thrusters of the spacecraft by optimizing a cost function over multiple receding horizons, wherein the cost function is composed of a cost accumulated over the multiple receding horizons, such that the cost accumulated over the multiple receding horizon includes a first horizon using a dynamics governing a north-south position of the spacecraft, and a cost accumulated over a second horizon using a model of dynamics of the spacecraft governing an east-west position and a model of dynamics of the momentum exchange devices of the spacecraft effecting a total orientation of the spacecraft, where the first horizon is shorter than the second horizon, and wherein the dynamics are associated with a motion of the spacecraft; and
a thruster controller to operate the thrusters according to their corresponding signals.

17. The spacecraft of claim 15, wherein the accumulated cost over the first horizon is a sum of a set of weights multiplying states associated with the north-south dynamics of the spacecraft.

18. The spacecraft of claim 15, wherein the accumulated cost over the second horizon is a sum of a set of weights multiplying states associated with the east-west dynamics of the spacecraft, such that the dynamics are associated with a motion of the spacecraft.

19. The spacecraft of claim 17, wherein the accumulated cost over the second horizon further includes a model of dynamics of the momentum exchange devices of the spacecraft effecting a total orientation of the spacecraft.

20. The spacecraft of claim 15, wherein the cost function includes a component for the pose of the spacecraft penalizing a displacement of the spacecraft from a target pose and a component for a momentum stored by the momentum exchange devices penalizing a larger value of a magnitude of the stored momentum.

21. The spacecraft of claim 15, wherein the model of dynamics of momentum exchange devices of the spacecraft includes dynamics of inner-loop control of the momentum exchange devices, wherein the model of dynamics of the spacecraft includes the dynamics of the inner-loop control, such that the solution of the MPC controller accounts for effects of actuation of the momentum exchange devices according to the inner-loop control, wherein the inner-loop control reduces an error between the orientation of the spacecraft and a target orientation of the spacecraft, wherein the solution of the MPC controller specifies angles and magnitude of the thrusts of the thrusters to reduce speed of the momentum exchange devices.

* * * * *